US010448585B2

(12) United States Patent
Kundra et al.

(10) Patent No.: US 10,448,585 B2
(45) Date of Patent: Oct. 22, 2019

(54) IRRIGATION MANAGEMENT VIA INTELLIGENT IMAGE ANALYSIS

(71) Applicant: Google LLC, Mountain View, CA (US)

(72) Inventors: Deepak Kundra, Mountain View, CA (US); John Nold, Mountain View, CA (US); James Stewart, San Mateo, CA (US); Ankit Mohan, San Carlos, CA (US); Leon Tan, Burlingame, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/812,041

(22) Filed: Nov. 14, 2017

(65) Prior Publication Data

US 2019/0141919 A1    May 16, 2019

(51) Int. Cl.
*A01G 25/16*      (2006.01)
*H04N 7/18*       (2006.01)
*G06K 9/00*       (2006.01)
*H04L 29/08*      (2006.01)

(52) U.S. Cl.
CPC ....... *A01G 25/165* (2013.01); *G06K 9/00657* (2013.01); *G06K 9/00718* (2013.01); *H04N 7/181* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 10,034,358 B1* | 7/2018 | Chen | ................... | H05B 37/0272 |
| 2012/0048960 A1* | 3/2012 | Malsam | ............... | A01G 25/092 239/1 |
| 2012/0268550 A1* | 10/2012 | Park | ................ | G08B 13/19602 348/14.02 |
| 2015/0223415 A1* | 8/2015 | Abhyanker | ............ | A01G 25/09 700/284 |
| 2016/0088807 A1* | 3/2016 | Bermudez Rodriguez | ................... | A01G 25/092 700/284 |
| 2016/0173440 A1* | 6/2016 | Stahura | ............... | G06F 16/9537 709/245 |
| 2017/0286772 A1* | 10/2017 | Workman | .............. | A01G 22/00 |
| 2018/0035606 A1* | 2/2018 | Burdoucci | ........... | A01D 34/008 |
| 2018/0098499 A1* | 4/2018 | Cleaver | .................. | A01D 91/00 |
| 2018/0192599 A1* | 7/2018 | Bermudez Rodriguez | ................... | A01G 25/092 |
| 2018/0213731 A1* | 8/2018 | Wykman | ............... | H04L 67/125 |
| 2018/0284016 A1* | 10/2018 | Fujiyama | ............. | G01N 21/359 |

* cited by examiner

*Primary Examiner* — Reza Aghevli

(74) *Attorney, Agent, or Firm* — Kilpatrick Townsend & Stockton LLP

(57) ABSTRACT

Various arrangements for visual control of a network-enabled irrigation system are presented. In some embodiments, a video stream of an outdoor location that can include a lawn may be captured. The video stream of the outdoor location may be transmitted to a cloud-based irrigation management server system. The lawn may be monitored for a period of time using the video stream. Based on monitoring the lawn for the period of time, a visual change in a state of the lawn may be identified. Based on the visual change in the state of the lawn, an adjustment of an irrigation program of the network-enabled irrigation system may be determined. An irrigation control message may be transmitted to the network-enabled irrigation system that alters an irrigation schedule for the lawn.

20 Claims, 12 Drawing Sheets

IRRIGATION MANAGEMENT VIA INTELLIGENT IMAGE ANALYSIS

BACKGROUND

Many factors go into control of an irrigation system, including the amount of sunlight, the types of plants being irrigated, the soil type, the local weather and humidity, the flow rate of the irrigation system, how the zones of the irrigation system are configured, the types of sprinkler heads, etc. At least some of these variables change over time and thus control of an irrigation system by a user can involve some amount of guesswork, estimation, and periodic adjustment. Incorrect guesses and estimation of how an irrigation system should be configured can lead to damaged plants, such as due to under-watering or overwatering. An arrangement that monitors plants and automatically adjusts an irrigation system for improved performance may benefit users.

SUMMARY

Various embodiments are described related to a method for visual control of a network-enabled irrigation system. In some embodiments, a method for visual control of a network-enabled irrigation system is described. The method may include capturing, using one or more network-enabled video cameras, one or more video streams of an outdoor location. The outdoor location may include a lawn. The method may include transmitting, by the one or more network-enabled video cameras, the one or more video streams of the outdoor location to a cloud-based irrigation management server system via the Internet. The method may include monitoring, by the cloud-based irrigation management server system, the lawn for a period of time using the one or more video streams. The method may include identifying, by the cloud-based irrigation management server system, based on monitoring the lawn for the period of time, a visual change in a state of the lawn. The method may include determining, based on the visual change in the state of the lawn, adjustment of an irrigation program of the network-enabled irrigation system. The method may include transmitting, by the cloud-based irrigation management server system, an irrigation control message to the network-enabled irrigation system via the Internet. The irrigation control message may cause the network-enabled irrigation system to alter an irrigation schedule for the lawn.

Embodiments of such a method may include one or more of the following features: Monitoring the lawn for the period of time using the one or more video streams may include the cloud-based irrigation management server system determining a duration during which sunlight is directly incident on at least a portion of the lawn. Monitoring the lawn for the period of time using the one or more video streams may include occasionally storing a frame from the one or more video streams of the outdoor location such that a plurality of frames are stored, each frame of the plurality of frames may have a timestamp. The system may include comparing at least a subset of the plurality of frames. Identifying the visual change in the state of the lawn based on monitoring the lawn for the period of time may include identifying, by the cloud-based irrigation management server system, a color change of the lawn over the period of time. The method may include performing, by the cloud-based irrigation management server system, a visual irrigation learning process. The process may include activating each zone of a plurality of zones of the network-enabled irrigation system sequentially. The process may include, while each zone of the plurality of zones of the network-enabled irrigation system is activated, monitoring the one or more video streams of the outdoor location. The process may include, based on monitoring the one or more video streams of the outdoor location, mapping each zone of the plurality of zones of the network-enabled irrigation system to a corresponding portion of the outdoor location. The process may include storing a data structure that maps each zone of the plurality of zones to the corresponding portion of the outdoor location. Performing the visual irrigation learning process may further include determining that a first zone and a second zone of the plurality of zones overlap. The process may further include transmitting, by the cloud-based irrigation management server system, a notification to a user linked with a user account that is linked with the network-enabled irrigation system. The notification may be indicative of the overlap between the first zone and the second zone. The method may include identifying, by the cloud-based irrigation management server system, based on monitoring the lawn for the period of time, a recommended physical change to be made to the network-enabled irrigation system. The method may include transmitting, by the cloud-based irrigation management server system, a notification to a user linked with a user account that is linked with the network-enabled irrigation system. The notification may be indicative of the recommended physical change to be made to the network-enabled irrigation system. The recommended physical change may be selected from a group consisting of a change in a spray pattern of a sprinkler of the network-enabled irrigation system. The method may include a change in a sprinkler type of the sprinkler of the network-enabled irrigation system. The method may include a replacement of the sprinkler of the network-enabled irrigation system. The method may include receiving an indication of a location of the network-enabled irrigation system. The method may include performing a look-up of a soil type typically found in a region that includes the location of the network-enabled irrigation system. The irrigation control message that causes the network-enabled irrigation system to alter the irrigation schedule for the lawn may be at least partially based on the soil type typically found in the region. Altering the irrigation schedule for the lawn may include an action selected from the group consisting of increasing an amount of time of watering of the lawn by the network-enabled irrigation system. The method may include decreasing the amount of time of watering of the lawn by the network-enabled irrigation system. The method may include changing a start time of watering of the lawn by the network-enabled irrigation system. The method may further include initiating, by the network-enabled irrigation system, irrigation in accordance with the altered irrigation schedule.

In some embodiments, a network-enabled irrigation system is described. The system may include a network-enabled streaming video camera that transmits a video stream of an outdoor location comprising a lawn via the Internet to a cloud-based irrigation management server system. The system may include the cloud-based irrigation management server system. The server system may include one or more processors. The server system may include a memory communicatively coupled with and readable by the one or more processors and having stored therein processor-readable instructions which, when executed by the one or more processors, cause the one or more processors to monitor the lawn for a period of time using the video stream. The one or more processors may identify, based on monitoring the lawn for the period of time, a visual change in a state of the lawn.

The one or more processors may determine, based on the visual change in the state of the lawn, adjustment of an irrigation program of the network-enabled irrigation system. The one or more processors may transmit an irrigation control message to a network-enabled irrigation system via the Internet. The irrigation control message may cause the network-enabled irrigation system to alter an irrigation schedule for the lawn.

Embodiments of such a system may include one or more of the following features: The system may be configured to alter the irrigation schedule based on the irrigation control message. The system may be configured to water the lawn based on the altered irrigation schedule. The processor-readable instructions that, when executed, cause the one or more processors to monitor the lawn for the period of time using the video stream may include processor-readable instructions which, when executed, cause the one or more processors to determine a duration during which sunlight is directly incident on at least a portion of the lawn. The processor-readable instructions that, when executed, cause the one or more processors to monitor the lawn for the period of time using the video stream may include processor-readable instructions which, when executed, cause the one or more processors to occasionally store a frame from the video stream of the outdoor location such that a plurality of frames are stored, each frame of the plurality of frames may have a timestamp. The one or more processors may compare at least a subset of the plurality of frames. The processor readable instructions that, when executed, cause the one or more processors to identify the visual change in the state of the lawn based on monitoring the lawn for the period of time may include processor-readable instructions which, when executed, cause the one or more processors to identify a color change of the lawn over the period of time. The one or more processors may perform a visual irrigation learning process including activating each zone of a plurality of zones of the network-enabled irrigation system sequentially. The process may include, while each zone of the plurality of zones of the network-enabled irrigation system is activated, monitoring the one or more video streams of the outdoor location. The process may include, based on monitoring the one or more video streams of the outdoor location, mapping each zone of the plurality of zones of the network-enabled irrigation system to a corresponding portion of the outdoor location. The process may include storing a data structure that maps each zone of the plurality of zones to the corresponding portion of the outdoor location. The processor readable instructions that, when executed, cause the one or more processors to perform the visual irrigation learning process may further include processor-readable instructions which, when executed, may cause the one or more processors to determine that a first zone and a second zone of the plurality of zones overlap. The one or more processors may cause a notification to be transmitted to a user linked with a user account that is linked with the network-enabled irrigation system. The notification may be indicative of the overlap between the first zone and the second zone. The one or more processors may identify, based on monitoring the lawn for the period of time, a recommended physical change to be made to the network-enabled irrigation system. The one or more processors may transmit a notification to a user linked with a user account that is linked with the network-enabled irrigation system. The notification may be indicative of the recommended physical change to be made to the network-enabled irrigation system.

In some embodiments, a non-transitory processor readable medium is described. The medium may include processor-readable instructions. The instructions may be configured to cause the one or more processors to receive, from one or more network-enabled video cameras, one or more video streams of an outdoor location via the Internet. The one or more processors may monitor the lawn for a period of time using the one or more video streams. The one or more processors may identify, based on monitoring the lawn for the period of time, a visual change in a state of a lawn present in the outdoor location. The one or more processors may determine, based on the visual change in the state of the lawn, adjustment of an irrigation program of a network-enabled irrigation system. The one or more processors may transmit an irrigation control message to a network-enabled irrigation system via the Internet. The irrigation control message may cause the network-enabled irrigation system to alter an irrigation schedule for the lawn.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Smart devices, such as network-enabled indoor and outdoor security cameras are becoming more common. Users, such as homeowners or renters of a home, may tend to install such devices to monitor activity inside and/or outside of their home. While the primary use of such video may be security, additional uses for such video may be present. For instance, an outdoor video camera may tend to capture images of some or all of a home's outdoor greenspace. Such greenspace may include a lawn, trees, bushes, plants, and/or a garden. Observations made via the video camera may be used to control an irrigation system instead of, or in addition to, a locally or remotely controlled irrigation timer.

For instance, an indoor or outdoor security camera may have a field-of-view that encompasses a home's front lawn. Changes in the lawn may be observed over time, such as the lawn browning or yellowing. Such color changes may be indicative of the health of a plant and may be indicative of a lack of water or overwatering, respectively. A cloud-based server system that receives, analyzes, and stores video received from the security camera may instruct a network-enabled irrigation system to adjust irrigation accordingly. Further detail is provided in reference to the figures.

Figure 1:
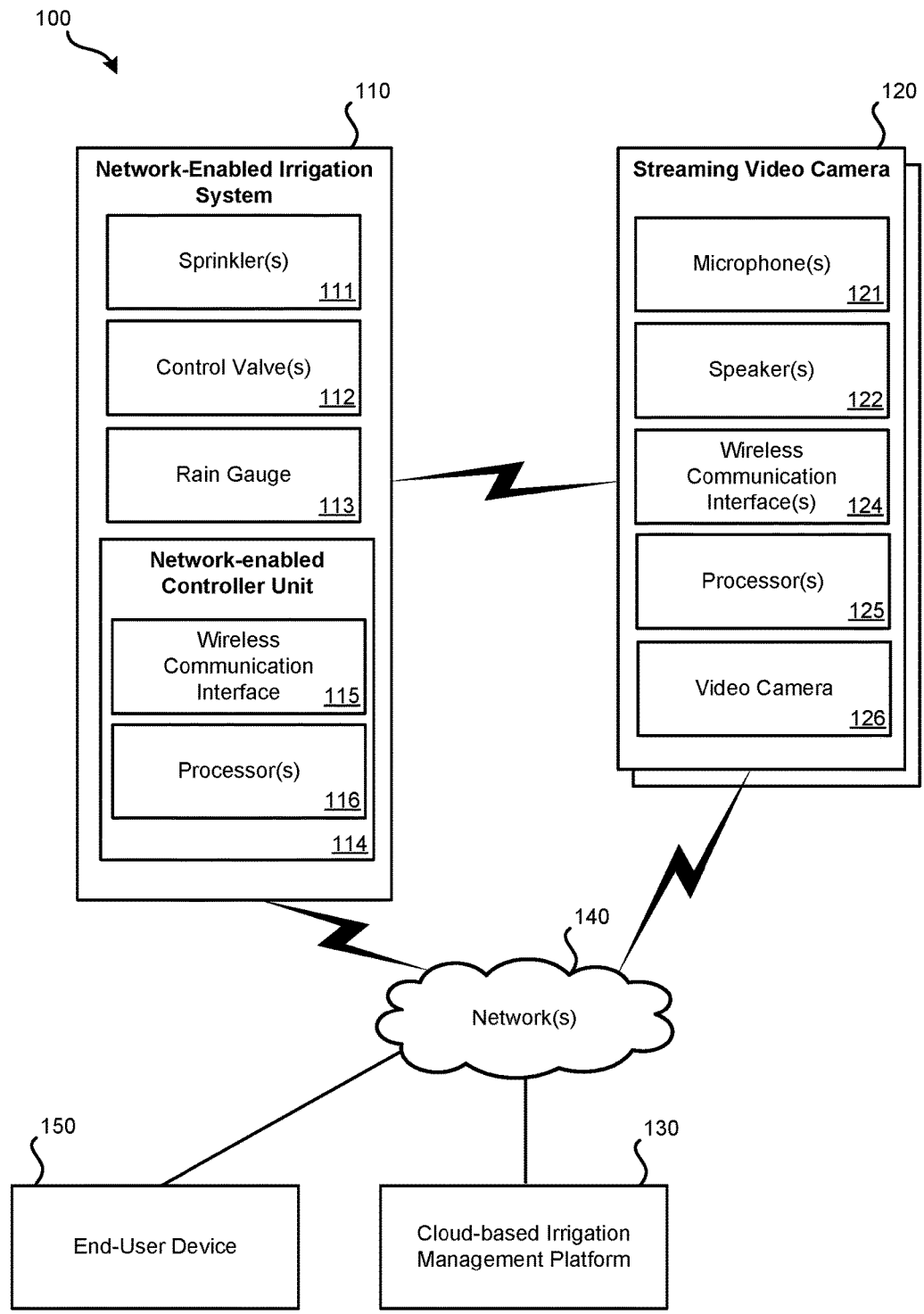
FIG. 1 illustrates an embodiment of a network-enabled irrigation system.

FIG. 1 illustrates an embodiment of a block diagram of a network-enabled irrigation system 100. System 100 may include: network-enabled irrigation system 110, streaming video camera 120, cloud-based irrigation management platform 130, network 140, and end-user device 150. Network-enabled irrigation system 110 may include: one or more sprinklers 111, one or more control valves 112, rain gauge 113, and network-enabled controller unit 114. Sprinklers 111 may include multiple different types of sprinkler heads and/or drip lines that are installed in and around a home's greenspace. Such a greenspace may include: one or more lawns, plants, trees, bushes, shrubs, flowerbeds, gardens, etc. The greenspace may include any form of flora that periodically is watered by system 110. Sprinklers 111 can include: rotors, fixed-head, impact, drip lines, and/or other types of water sprayers or distributors. Sprinklers 111 may be grouped into various zones, with each zone being controlled by a control valve of one or more control valves 112. Typically, a single zone of sprinklers is activated at a given time to maintain sufficient water pressure. Control valves 112 may control when water is released to sprinklers 111. Control valves 112 may receive electrical signals from network-enabled controller unit 114. Based on the received electrical signals, water may be released to sprinklers 111 by control valves 112, typically a single zone at a time.

Rain gauge 113 may be used to determine if rain has recently fallen in the vicinity of network-enabled irrigation system 110. Wired or wireless communication between rain gauge 113 and network-enabled controller unit 114 may permit network-enabled controller unit 114 to determine if water has recently fallen on rain gauge 113. An irrigation schedule enforced by network-enabled controller unit 114 may be adjusted based on water present in or measured by rain gauge 113.

Network-enabled controller unit 114 may include: wireless communication interface 115 and one or more processors 116. Network-enabled controller unit 114 may enforce a user-defined or server defined irrigation schedule. This irrigation schedule may define when control valves 112 are activated such that water is released to sprinklers 111. Wireless communication interface 115 may permit one or more processors 116 to communicate with a remote system such as cloud-based irrigation management platform 130. Network-enabled controller unit 114 may enforce a locally-stored irrigation schedule or may receive irrigation instructions from cloud-based irrigation management platform 130 (which may store an irrigation schedule for system 110). In some embodiments, network-enabled controller unit 114 enforces a locally-stored irrigation schedule unless changes or an update to the irrigation schedule is received from cloud-based irrigation management platform 130.

Streaming video camera 120 may include: one or more microphones 121, one or more speakers 122, one or more wireless communication interfaces 124, one or more processors 125, and video camera 126. Video camera 126 may capture (color) video of a field-of-view at which streaming video camera 120 is pointed. Streaming video camera 120 may be installed inside or outside of a home. For streaming camera 120 to be used in controlling system 110, at least a portion of the field-of-view of video camera 126 may include some part of the home's greenspace. Video captured using video camera 126 may be streamed to cloud-based irrigation management platform 130 via network 140. Streaming video camera 120 may also capture sound via microphone 121. Such sound may also be streamed to cloud-based irrigation management platform 130 via network 140. Wireless communication interface 124 may be used by streaming video camera 120 to wirelessly communicate with network 140. One or more wireless communication interfaces 124 may communicate using a Wi-Fi® network using an IEEE 802.11 wireless standard, Thread®, ZigBee®, Z-Wave®, Bluetooth®, and/or some other communication standard. One or more processors 125 may coordinate video capture and transmission to cloud-based irrigation management platform 130. One or more speakers 122 may permit audio to be output by streaming video camera 120, such as based on data received from cloud-based irrigation management platform 130.

At a home, multiple streaming video cameras may be installed. For instance, streaming video camera 120 may be installed outdoors and may have a view of some or all of a home's front lawn. One or more other streaming video cameras may be installed that view another portion or an overlapping portion of the home's greenspace, such as a backyard. Such other streaming video cameras function similarly to streaming video camera 120 and may stream video and audio to cloud-based irrigation management platform 130 for storage and analysis.

One or more networks 140 represent various wireless and/or wired networks that allow network-enabled irrigation system 110 and streaming video camera 120 to communicate with each other, end-user device 150, and/or cloud-based irrigation management platform 130. Networks 140 may include a private wireless local area network (LAN), such as a Wi-Fi® network. Networks 140 may also include the Internet to which the Wi-Fi® network may be connected.

Cloud-based irrigation management platform 130 may at least partially control operation of network-enabled irrigation system 110 based on video received from streaming video camera 120. It should be understood that cloud-based irrigation management platform 130 may serve additional functions. For instance, a primary purpose of streaming video camera 120 may be for security. Such video may be streamed to irrigation management platform 130 for storage and analysis, such as for motion within particular regions of the streaming video. Functionality related to irrigation may be performed in addition or in alternate to functionality related to security provided by irrigation management platform 130. Additional detail regarding cloud-based irrigation management platform 130 is provided in relation to FIG. 3A.

In some embodiments, streaming video camera 120 and network-enabled irrigation system 110 may communicate directly (e.g., via Weave, Bluetooth®, or Wi-Fi Direct®) or through network 140 without communicating with irrigation management platform 130. In such embodiments, either network-enabled irrigation system 110 or streaming video camera 120 may perform the functionality attributed to irrigation management platform 130 herein.

End-user device 150 may allow an end-user to communicate with network-enabled irrigation system 110, streaming video camera 120, and/or cloud-based irrigation management platform 130. End-user device 150 may be a smartphone, tablet computer, laptop, or some other form of computerized device that can serve as a user interface (UI) for network-enabled irrigation system 110, streaming video camera 120, and/or cloud-based irrigation. For instance, via end-user device 150, an end-user may be able to access network-enabled irrigation system 110 or cloud-based irrigation management platform 130 (e.g., via a webpage or native application) and adjust the irrigation schedule of system 110 manually. The end-user may also be able to use end-user device 150 to access streaming video camera 120 and/or irrigation management platform 130 to view video captured by video camera 126 and listen to sound captured via one or more microphones 121. A user may also be able to input sound, such as spoken speech, to be transmitted to and output via speaker 122.

Figure 2:
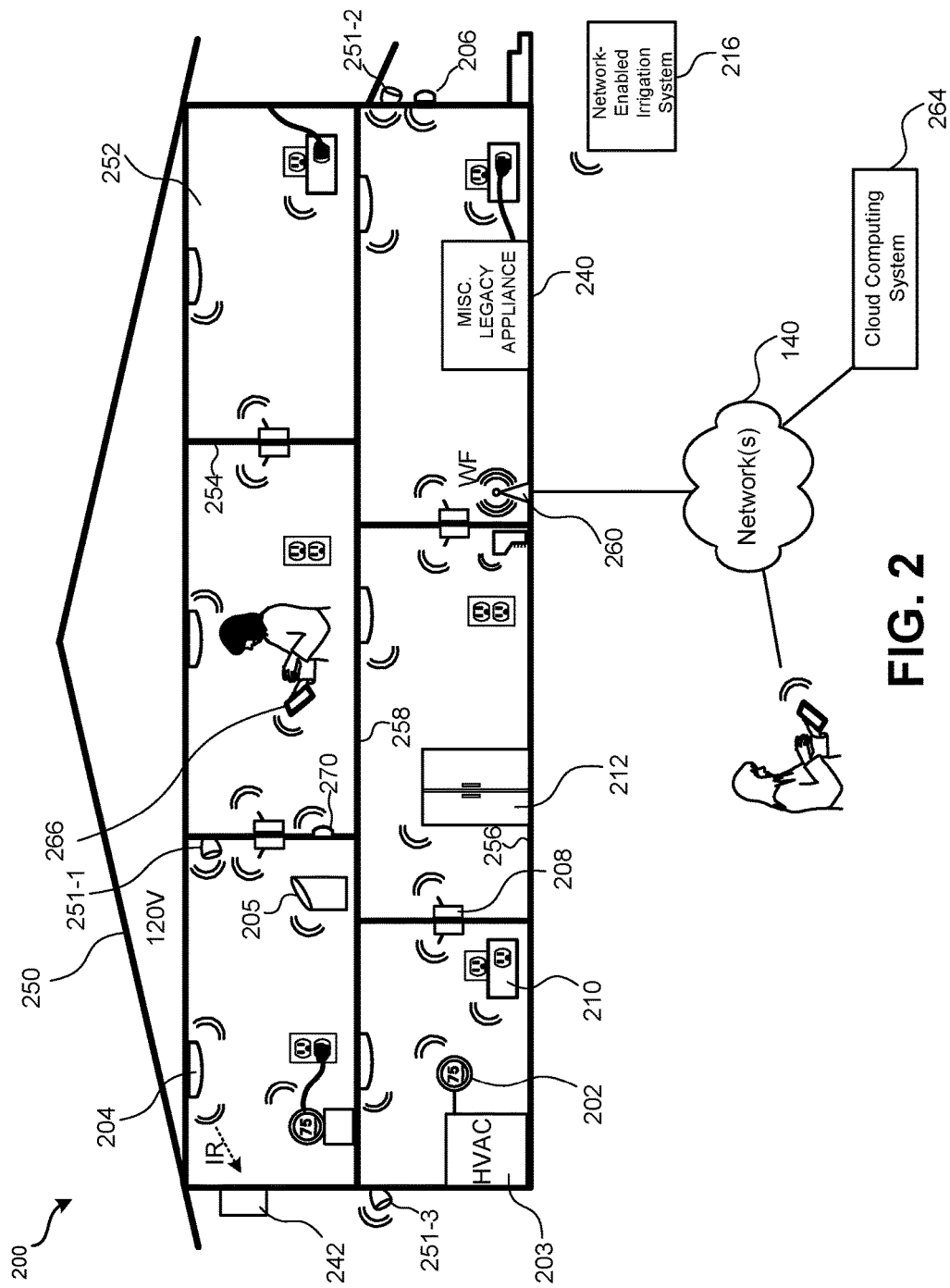
FIG. 2 illustrates an embodiment of a smart-home environment within which one or more of the devices, methods, systems, and/or services described herein are applicable.

While FIG. 1 focuses on the network-enabled irrigation system and streaming video camera, these devices may function as part of a more complicated home automation environment. FIG. 2 illustrates an embodiment of a smart-home environment within which one or more of the devices, methods, systems, and/or services described herein are applicable. The depicted smart-home environment 200 includes a structure 250, which can include, e.g., a house, office building, garage, or mobile home. It will be appreciated that devices can also be integrated into a smart-home environment 200 that does not include a stand-alone structure 250, such as an apartment, condominium, or office space. Further, the smart-home environment can control and/or be coupled to devices outside of the structure 250. Indeed, several devices in the smart-home environment need not physically be within the structure 250 at all. For example, a device controlling a pool heater or network-enabled irrigation system 216 (which can represent network-enabled irrigation system 110 of FIG. 1) can be located outside of the structure.

The depicted structure 250 includes a plurality of rooms 252, separated at least partly from each other via walls 254. The walls 254 can include interior walls or exterior walls. Each room can further include a floor 256 and a ceiling 258. Devices can be mounted on, integrated with and/or supported by a wall 254, floor 256 or ceiling 258.

In some embodiments, the smart-home environment 200 of FIG. 2 includes a plurality of devices, including intelligent, multi-sensing, network-connected devices (sometimes referred to herein as "smart devices") that can integrate seamlessly with each other and/or with a central server or a cloud-computing system to provide any of a variety of useful smart-home objectives, including hazard-detection objectives, home security functionality, and home assistant functionality. The smart-home environment 200 may include one or more intelligent, multi-sensing, network-connected smart thermostats 202 (hereinafter referred to as "smart thermostats 202"), one or more intelligent, network-connected, multi-sensing smart hazard detection units (hereinafter referred to as "smart hazard detectors 204"), and one or more intelligent, multi-sensing, network-connected entry-way interface smart doorbell devices 206 (hereinafter referred to as "smart doorbells 206"). Smart thermostats 202, smart hazard detectors 204, smart doorbells 206 are all examples of smart devices but are by no means exclusive. Streaming video cameras 251 (251-1, 251-2, and 251-3), which can represent streaming video camera 120 of FIG. 1, may also be smart devices.

Smart home assistant device 205 may receive spoken commands from a user and may respond using synthesized speech to such commands. Home assistant device 205 may perform various actions in response to such commands, such as accessing and outputting information, issuing a command to another device or cloud-based server, storing information, or otherwise performing an action in response to a spoken command of a user.

According to embodiments, the smart thermostat 202 detects ambient climate characteristics (e.g., temperature and/or humidity) and controls a climate control system 203 accordingly, such as by turning on and/or off a fan and/or a heat source of the climate control system 203. (In the present disclosure, "climate control system" is used interchangeably with "HVAC system," to clarify that the disclosure applies equally to systems that do not necessarily include air conditioning. Use of the term "HVAC" herein does not exclude systems that lack air conditioning.)

When the fan of the climate control system 203 is on, the fan operates to circulate air between the rooms 252 of the structure 250, and to exhaust air from the structure 250 and draw fresh, outside air into the structure 250. The smart hazard detector 204 may detect the presence of a hazardous condition or a substance indicative of a hazardous condition (e.g., smoke, fire, heat, carbon monoxide, etc.). The smart doorbell 206 may detect a person's approach to or departure from a location (e.g., an outer door), control doorbell functionality, announce a person's approach or departure via audio or visual means, or control settings on a security system (e.g., to activate or deactivate the security system when occupants go and come). A streaming video camera, such as outdoor streaming video camera 251-2, may be part of or installed near smart doorbell 206 in order to provide video of activity in the vicinity of smart doorbell 206.

While in this example, three streaming video cameras are present, only two may be used for controlling network-enabled irrigation system 216. That is, only streaming video cameras 251-2 and 251-3 may have fields-of-view that include greenspace of structure 250. It should be understood that in other embodiments, some other number of cameras, greater or smaller, may have a view of some or all of the home's outdoor greenspace.

In some embodiments, the smart-home environment 200 of FIG. 2 further includes one or more intelligent, multi-sensing, network-connected wall switches 208 (hereinafter referred to as "smart wall switches 208," which can be a form of smart device), along with one or more intelligent, multi-sensing, network-connected wall plug interfaces 210 (hereinafter referred to as "smart wall plugs 210," which can be a form of smart device). The smart wall switches 208 may detect ambient lighting conditions, detect room-occupancy states, and control a power and/or dim state of one or more lights. In some instances, smart wall switches 208 may also control a power state or speed of a fan, such as a ceiling fan. The smart wall plugs 210 may detect occupancy of a room or enclosure and control supply of power to one or more wall plugs (e.g., such that power is not supplied to the plug if nobody is home).

Still further, in some embodiments, the smart-home environment 200 of FIG. 2 includes a plurality of intelligent, multi-sensing, network-connected smart appliances 212 (hereinafter referred to as "smart appliances 212," which can be a form of smart device), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected smart appliances 212 are made compatible with the smart-home environment by cooperating with the respective manufacturers of the appliances. For example, the smart appliances can be space heaters, window AC units, motorized duct vents, etc. When plugged in, an appliance can announce itself to the smart-home network, such as by indicating what type of appliance it is, and it can automatically integrate with the controls of the smart-home, and, possibly, perform HA services. Such communication by the appliance to the smart home can be facilitated by any wired or wireless communication protocols known by those having ordinary skill in the art. The smart home also can include a variety of non-communicating legacy appliances 240, such as old conventional washer/dryers, refrigerators, and the like which can be controlled, albeit coarsely (ON/OFF), by virtue of the smart wall plugs 210. The smart-home environment 200 can further include a variety of partially communicating legacy appliances 242, such as infrared ("IR") controlled wall air conditioners or other IR-controlled devices, which can be controlled by IR signals provided by the smart hazard detectors 204 or the smart wall switches 208.

By virtue of network connectivity, one or more of the smart-home devices of FIG. 2 can further allow a user to interact with the device even if the user is not proximate to the device. For example, a user can communicate with a device using end-user device 266 (e.g., a desktop computer, laptop computer, or tablet) or some other portable electronic device (e.g., a smartphone). A webpage or app can be configured to receive communications from the user and control the device based on the communications and/or to present information about the device's operation to the user. For example, the user can view a current setpoint temperature for a device and adjust it, using end-user device 266. The user can be in the structure during this remote communication, or outside the structure.

As discussed, users can control the smart thermostat and other smart devices in the smart-home environment 200 using end-user device 266, which as noted above may be a network-connected computer or portable electronic device such as a smartphone or tablet. In some examples, some or all of the occupants (e.g., individuals who live in the home) can register their end-user device 266 with the smart-home environment 200. Such registration can be made at a central server to authenticate the occupant and/or the device as being associated with the home and to give permission to the occupant to use the device to control the smart devices in the home. An occupant can use an end-user device 266 (which can represent end-user device 150 of FIG. 1) to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to end-user device 266, the smart-home environment 200 makes inferences about which individuals live in the home and are therefore occupants and which end-user devices 266 are associated with those individuals. As such, the smart-home environment "learns" who is an occupant and permits the end-user device 266 associated with those individuals to control the smart devices of the home.

According to embodiments, all or some of the smart devices can serve as wireless or wired repeaters. For example, a first one of the smart devices can communicate with a second one of the smart devices via a wireless router 260. The smart devices can further communicate with each other via a connection to one or more networks 140, such as the Internet. Through the Internet, the smart devices can communicate with a central server or a cloud-computing system 264, which may host the cloud-based HA integration platform 130. The central server or cloud-computing system 264 can be associated with a manufacturer, support entity, or service provider associated with the device. Certain embodiments can transmit data such as streaming video, measurements of temperature, light, smoke, CO, sound, motion, control settings, alarm status, actions performed by the smart devices, and the like to cloud-computing system 264 for analysis. Further, software updates can be automatically sent from the central server or cloud-computing system 264 to devices (e.g., when available, when purchased, or at routine intervals).

Figure 3A:
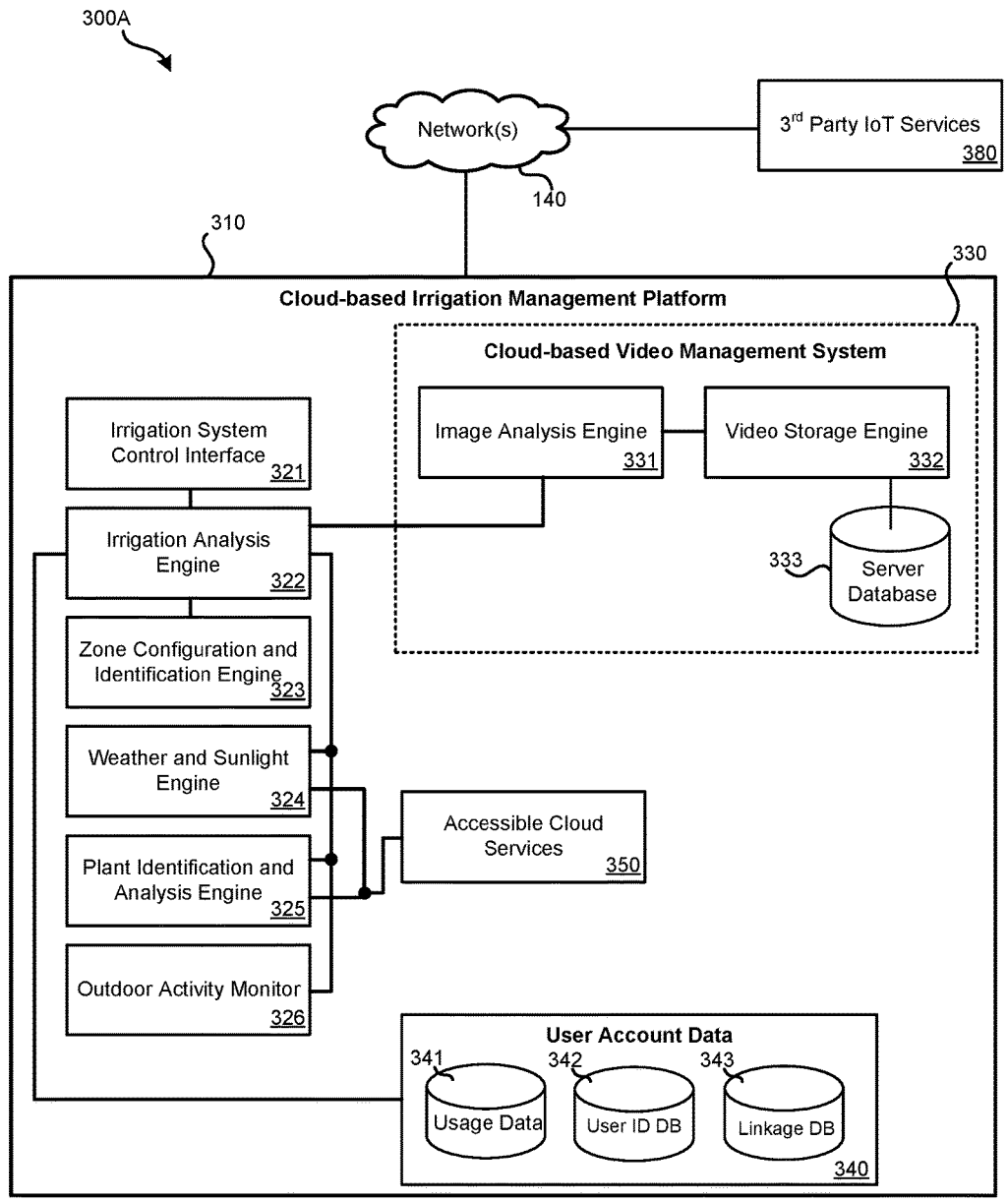
FIG. 3A illustrates an embodiment of a cloud-based irrigation control server system.

FIG. 3A illustrates an embodiment of a cloud-based irrigation control server system 300. Cloud-based irrigation control server system 300A can include: cloud-based irrigation management platform 310, $3^{rd}$ party IoT services 380, and one or more networks 140. Cloud-based irrigation management platform 310 may represent functionality executed by one or more cloud-based server systems, which may be distributed geographically. It should be understood that the various components of platform 310 may be implemented using processors, memories, storage mediums, network interfaces, and communication buses, possibly along with additional other general-purpose and/or specialized computing components. The various engines, monitors, and services of platform 310 may be implemented as instructions in the form of code that is executable by one or more general purpose processors. Alternatively, such instructions may be used to configure or design special-purpose processors that are dedicated to the respective tasks.

Cloud-based irrigation management platform 310 may include: cloud-based video management system 330 and components that perform irrigation-related processing. Cloud-based video management system 330 may perform video analysis on streaming video received from a network-enabled video camera, such as streaming video camera 120. Cloud-based video management system 330 may analyze the video for irrigation purposes and/or other purposes, such as security. For instance, a network-enabled video camera may primarily be for security and irrigation may be a secondary feature that is made available if a sufficient area of greenspace is visible within the field of view of the network-enabled video camera.

Image analysis engine 331 may perform analysis of the video frames received from the network-enabled streaming video camera. Further detail regarding such image processing is provided in relation to FIG. 5. Video storage engine 332 may serve to store and archive video received from the streaming video camera. For example, video may automatically be saved for a defined period of time, such as one week or a month. A user may have the option to intervene and request video be stored for shorter or longer durations of time. Video storage engine 332 may store the video to video feed database 333 along with an indication as to which user account the video is linked.

Image analysis engine 331 may perform image analysis related to security (e.g., detecting motion and/or sound). Irrigation analysis engine 322 may use such video analysis along with data gathered from multiple other components 321, 323, 324, 325, 326, and 350 to determine how to adjust control of a network-enabled irrigation system. Analyzed video data may be output to irrigation analysis engine 322 for further analysis in relation to irrigation.

Image analysis by image analysis engine 331 may be performed on frames captured over time to detect changes in the color of at least a portion of the greenspace, such as a lawn. Irrigation analysis engine 322 may be able to detect a shift in color between green, brown, and yellow. If, for example, the averaged color of a portion of a greenspace shifts towards brown, irrigation analysis engine 322 may determine that the irrigation system should be activated for a longer duration, at a different time, and/or more frequently. If the averaged color shifts towards yellow, irrigation analysis engine 322 may determine that the irrigation system should be activated for a shorter duration, at a different time, and/or less frequently (yellow grass being a symptom of overwatering). To perform such a color analysis, one or more frames from the streaming video may be periodically captured and stored and used for comparison. For example, a frame captured may be used for comparison to a second frame, captured some number of days or weeks later. For instance, a color analysis of a lawn may be performed daily based on images captured one week apart. As such, trends in the change of a lawn's color may be observed over time. Such a change may be used for flora growing in the greenspace other than a lawn, such as bushes, flowers, trees, etc.

Image analysis may also be used to determine an amount of direct sun that various portions of the greenspace receive. Over a period of one or more days, the amount of direct sun that portions of the greenspace receive may be analyzed and averaged to provide a user with a report indicative of the amount of direct sun and, possibly, adjust control of the network-enabled irrigation system. Determining the amount of direct sun received by a region of the greenspace may be based on the measured brightness of the corresponding regions of the streaming video camera's field of view and/or using data from a local weather station. Brightness being detected from at least a portion of the field-of-view above a particular threshold during daylight hours may be indicative of direct sun being incident on the greenspace present in the portion of the field-of-view.

Irrigation system control interface 321 may be used for analyzing data received from the irrigation system and creating messages to be transmitted to the irrigation system. Based on the analysis performed by irrigation analysis engine 322 using data from the various components of platform 310, irrigation system control interface 321 may adjust the functionality of the network-enabled irrigation system. Further, irrigation system control interface 321 may receive information from the irrigation control system, such as an irrigation schedule, rain gauge measurements, and/or indications of individual zones as they are activated and deactivated. As such, platform 310 may be informed of when the irrigation system is performing watering. In some embodiments, irrigation analysis engine 322 may store locally an irrigation schedule which it implements using the network-enabled irrigation system via irrigation system control interface 321.

Zone configuration identification engine 323 may be used to initially learn about the irrigation system and determine what portions of the greenspace that are visible within the streaming video camera's field-of-view are watered by the irrigation system. Initially, zone configuration and identification engine 323 may, via irrigation system control interface 321, cause zones of the irrigation system to be sequentially activated one at a time. While each zone is activated, image analysis by image analysis engine 331 may be performed to determine a portion of the greenspaces being watered. As such, a map of each irrigation zone may be created. Therefore, platform 310 will have data indicative of what portions of the greenspace will be watered when a particular zone of the irrigation system is activated.

Zone configuration and identification engine 323 may further be configured to cause notifications to be output to an end-user that are indicative of changes recommended to be made to the irrigation system. Such changes may be physical in nature. For example, if zone configuration identification engine 323 determines that a significant amount of overlap is present between two zones, a recommendation may be made to adjust the spray pattern of one or more sprinklers present in one or more of the overlapping zones. Another possible form of recommendation that may be made is to change the type of one or more sprinkler heads, such as switching a sprinkler head from being a fixed pattern sprinkler to being a rotor. Another possible physical change may be a recommendation to adjust the throw distance of a sprinkler's nozzle. Still another possible physical change may be a recommendation to replace a sprinkler head (e.g., due to the sprinkler head being damaged).

Weather and sunlight engine 324 may further analyze video or images to determine the amount of sunlight incident on the greenspace on a particular day and/or the localized weather. Conventionally, many smart devices may obtain weather information by accessing a remote weather database using a ZIP Code or address at which the smart devices are installed. However, this weather device is typically obtained from a weather station which may be a significant distance (e.g., further than half a mile) from the home at which the irrigation system is installed. Therefore, significant weather and/or sunlight differences may be observed between the location of the weather station and the home at which the irrigation system is installed. In certain regions, weather, such as rain, tends to be highly localized; therefore, while it may have rained substantially at a local weather station, no rain may actually have fallen at the home. Video may be analyzed by weather and sunlight engine 324 to determine if rain fell at the home on the greenspace. Rain may be visually measured by detecting a decrease in visibility from the streaming video camera to one or more points within the field-of-view. This change in visibility may be quantified as an amount of rain that is falling according to a predefined algorithm. The greater the decrease in visibility, the greater the amount of rain that is falling. Sound captured by the video camera may also be used to quantify the amount of rain falling. The louder the rain, for instance, the greater the amount of rain.

Weather and sunlight engine 324 may also track the amount of sunlight received by various portions of the greenspace in a given day. The amount of cloud cover may be highly localized; as such, rather than relying on data from a weather station, video analyzed by image analysis engine 331 or irrigation and analysis engine 322 may be used to determine the precise amount of direct sunlight received by at least a portion of the greenspace. The amount of direct sun may be determined based on the observed brightness level in frames captured by the streaming video camera.

Plant identification and analysis engine 325 may be used to determine the types of plants present within the greenspace. An end-user may not know the names of particular plants within his greenspace and may not be aware of the particular watering and sunlight requirements of such plants. Plant identification and analysis engine 325 may perform analysis of the various flora present to identify the amount of water required by such types of plants and adjust the irrigation schedule accordingly. For instance, a plant present in the video camera's field-of-view may be analyzed against plants present in an accessible plant identification database. If a match is present, the plant's identity may be provided or made available to the end user. Plant identification analysis engine 325 may also be able to identify weeds that are present. To identify a weed, plant identification analysis engine 325 may identify the plant based on a comparison to a local or remote plant database. This plant in the database may be noted as typically being considered a weed. The end-user may be informed, via notification of the location of the weed, of what it looks like, and provided a recommendation to remove it. Plant identification and analysis engine 325 may also make recommendations to an end user to remove particular plants that are not weeds due to the plant not being suitable for the environment of the greenspace. For instance, a particular plant may be present that requires a large amount of water, even though the greenspace is in an arid environment. Again here, individual plants may be identified by accessing a local or remote plant database, and then accessing data associated with the database entry, such as water requirements, recommended environment, recommend amount of sunlight, etc.

Outdoor activity monitor 326 may monitor video for activities that affect the greenspace. For instance, activities performed by a person or animal in the greenspace may greatly affect the ability of the greenspace to be healthy. For instance, a dog using the greenspace as a bathroom may negatively impact the health of a lawn and/or other nearby plants. As another example, a person repeatedly walking over the lawn may compact the soil and negatively impact the lawn. When such outdoor activity is identified by outdoor activity monitor 326, outdoor activity monitor 326 may activate the corresponding zone of the irrigation system to discourage the behavior and/or may send a notification to an end-user indicative of the behavior along with an image. In some embodiments, sound may be output by the video camera to attempt to discourage the behavior.

Accessible cloud services 350 represent other databases and/or services provided on platform 310 or a separate platform operated by the same service provider or another service provider that can be accessed by irrigation analysis engine 322. For instance, an additional weather service may be available via accessible cloud services 350. Irrigation analysis engine 322 may be able to query such a weather service for a particular date and a particular location and, in response, receive weather information. Such weather information may be used to complement weather data determined by weather and sunlight engine 324. As another example, a plant identification database may be accessible as an accessible cloud service. As another example, a soil database, water rate service, and/or community plant and harvesting information database may be accessible. Based on a zip code or address, the expected soil type can be retrieved, which may significantly affect water retention and how certain types of plants grow. As yet another example, a community flora database may be accessible. Such a database may include information relating to types of plants typically planted in a region. Data from such databases may be used by irrigation analysis engine 322 in determining how to modify an irrigation schedule of the network-enabled irrigation system.

Irrigation analysis engine 322 may access user account data 340 for certain types of received commands or queries. Various types of information may be stored as part of user account data 340. Within user account data, usage data 341 may store information regarding the duration and timestamp of when individual zones of the irrigation system were activated. Information indicative of how the irrigation schedule was adjusted may also be stored (e.g., irrigation cycle was shortened due to a lack of direct sunshine). User identification database 342 may store information that links an end user with a user account that is linked with the streaming video camera and irrigation system. A user account name and password may be linked with the user account. An end user may access data (e.g., video data, irrigation data) related to the user account by providing the username and password.

Device linkage database 343 may store information on smart devices, such as those detailed in relation to FIGS. 1 and 2, which are linked with a particular user account. A streaming video camera and a network-enabled irrigation system may be required to be linked with a same user account in order to permit platform 310 to provide irrigation management functionality. An end-user may perform a registration process in order to link both the streaming video camera and the network-enabled irrigation system with the user's account maintained by platform 310. Device linkage database 343 may also include entries for other smart home devices, such as those detailed in relation to FIG. 2 that have been linked with the same user account. Such devices indicated in device linkage database 343 may be manufactured by or operated by the entity that hosts platform 310 or by a separate entity that permits platform 310 to interact with their devices. For instance, a smart home appliance may be linked with streaming video camera 120 via device linkage database 343.

Third party IoT (Internet of Things) services 380 represent cloud-based services that are hosted by a provider separate from the provider that operates platform 310. For instance, if the streaming video camera and network-enabled irrigation system are manufactured by separate providers, communication through a third-party service provider may be necessary. For example, some forms of network-enabled irrigation systems may be operated through a third-party cloud service. Irrigation system control interface 321 may be able to send commands to and receive information from such a third-party IoT service 380 for transmission to the network-enabled irrigation system. Similarly, it may be possible that a streaming video camera may be provided as a third-party IOT service. As such, image analysis engine 331 may be able to obtain a video feed from the associated third-party IoT service 380.

Figure 3B:
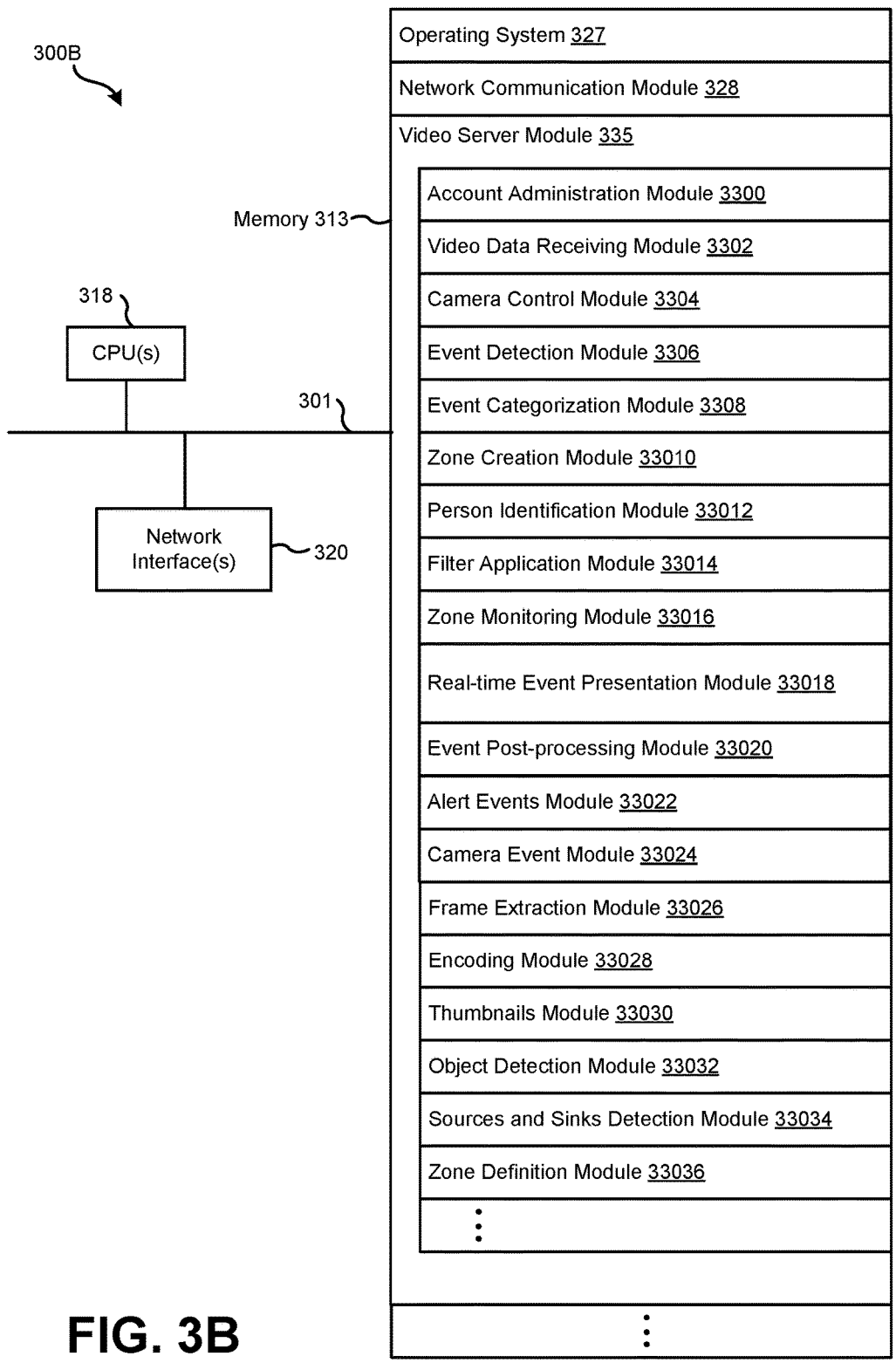
FIGS. 3B and 3C are block diagrams illustrating an embodiment of a video server system.
Figure 3C:
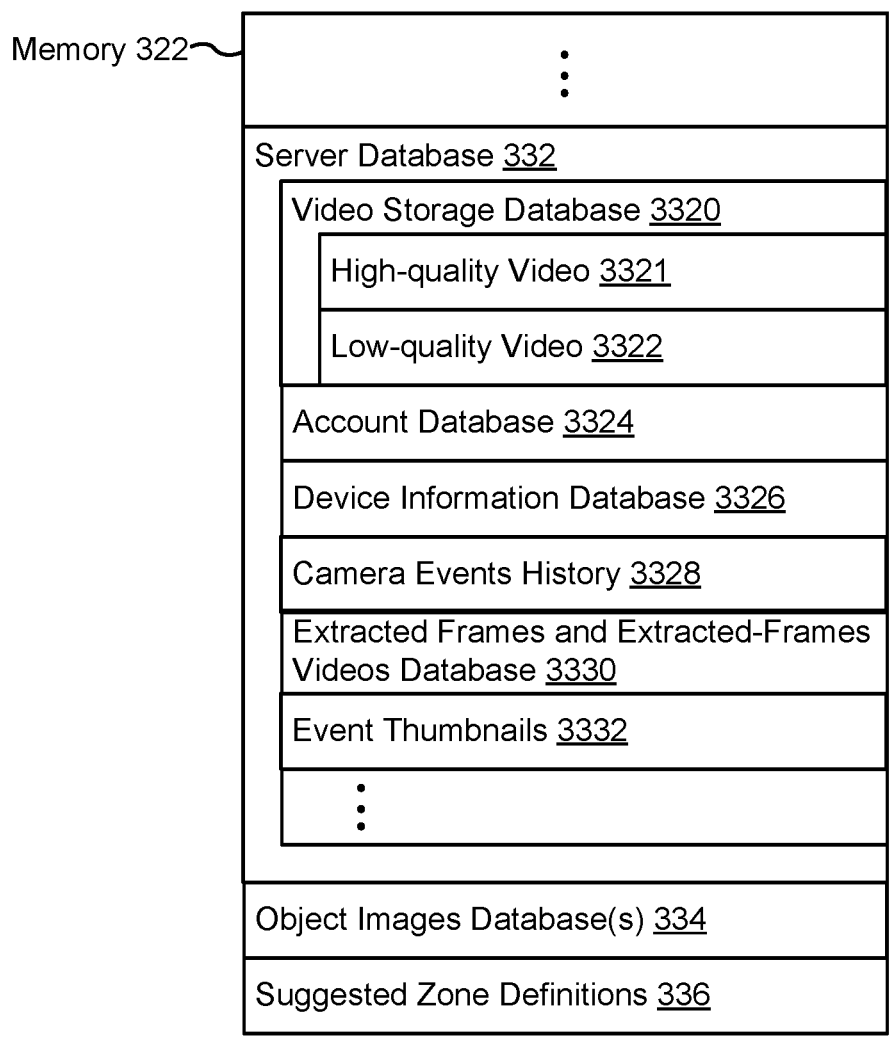

FIGS. 3B and 3C are block diagrams illustrating a video server 300B in accordance with some implementations. Video server 300B may represent a more detailed embodiment of cloud-based video management system 330 of FIG. 3A. Video server 300B may be executed using the same one or more servers as platform 310 or may represent distinct servers. Video server 300B may include one or more processing units (e.g., CPUs) 318, one or more network interfaces 320, memory 313, and one or more communication buses 301 for interconnecting these components (sometimes called a chipset). Memory 313 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 313, optionally, includes one or more storage devices remotely located from one or more processing units 318. Memory 313, or alternatively the non-volatile memory within memory 313, includes a non-transitory computer readable storage medium. In some implementations, memory 313, or the non-transitory computer readable storage medium of memory 313, stores the following programs, modules, and data structures, or a subset or superset thereof:

Operating system 327 including procedures for handling various basic system services and for performing hardware dependent tasks;

Network communication module 328 for connecting video server 300B to other systems and devices (e.g., client devices, electronic devices, and systems connected to one or more networks 162, FIGS. 1-5B) via one or more network interfaces 320 (wired or wireless);

Video server module 335, which provides server-side data processing and functionalities for video and event monitoring and review, including but not limited to:

Account administration module 3300 for creating reviewer accounts, performing camera registration processing to establish associations between video sources to their respective reviewer accounts, and providing account login-services to the client devices 504;

Video data receiving module 3302 for receiving raw video data from a streaming video camera, and preparing the received video data for event processing and long-term storage in the video storage database;

Camera control module 3304 for generating and sending server-initiated control commands to modify the operation modes of the video sources, and/or receiving and forwarding user-initiated control commands to modify the operation modes of the video sources 522;

Event detection module 3306 for detecting event candidates and candidates relating to changes in the state of a greenspace in video streams from each of the video sources 522, including motion track identification, false positive suppression, color analysis, growth analysis, and event mask generation and caching;

Event categorization module 3308 for categorizing events detected in received video streams;

Zone creation module 33010 for generating zones of interest in accordance with user input (e.g., define video zones that correspond to irrigation zones);

Person identification module 33012 for identifying characteristics associated with presence of humans in the received video streams;

Filter application module 33014 for selecting event filters (e.g., event categories, zones of interest, a human filter, etc.) and applying the selected event filter to past and new events detected in the video streams;

Zone monitoring module 33016 for monitoring changes within selected zones of interest and generating notifications for new events detected within the selected zones of interest, where the zone monitoring takes into account changes in surrounding context of the zones and is not confined within the selected zones of interest;

Real-time event presentation module 33018 for dynamically changing characteristics of event indicators displayed in user interfaces as new event filters, such as new event categories or new zones of interest, are created, and for providing real-time notifications as new events are detected in the video streams; and Event post-processing module 3020 for providing summary time-lapse for past events detected in video streams, and providing event and category editing functions to user for revising past event categorization results;

Alert events module 33022 for receiving information on alert events (e.g., detected hazards, detected sounds, etc.), instructing camera 120 to capture video in accordance with alert event information, and determining chronologies of alert events;

Camera events module 33024 for associating captured video with alert events, from the same smart home environment 200, that are proximate or contemporaneous in time, and logging camera histories of camera events;

Frame extraction module 33026 for extracting frames from raw video data from the video sources 522;

Encoding module 33028 for encoding extracted-frames video using frames extracted by the frame extraction module 33026;

Thumbnails module 33030 for selecting frames for and generating thumbnails for respective portions of video corresponding to events or alerts;

Object detection module 33032 for detecting objects and corresponding contours in video feeds;

Sources and sinks detection module 33034 for detecting sources and sinks of activity in video feeds; and Zone definition module 33036 for generating suggested zone definitions for detected objects;

Server database 333, including but not limited to:

Video storage database 3320 storing raw video data associated with streaming video camera, as well as event categorization models (e.g., event clusters, categorization criteria, etc.), event categorization results (e.g., recognized event categories, and assignment of past events to the recognized event categories, representative events for each recognized event category, etc.), event masks for past events, video segments for each past event, preview video (e.g., sprites) of past events, and other relevant metadata (e.g., names of event categories, location of the cameras 120, creation time, duration, etc.) associated with the events;

Account database 3324 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;

Device Information Database 3326 for storing device information related to one or more hub devices, e.g., device identifiers and hub device specific secrets, independently of whether the corresponding hub devices have been associated with any user account;

Camera events history 3328 for storing per-camera histories of camera events, including alert events, chronologies of alert events, and references to associated videos in the video storage database 3320;

Extracted frames and extracted-frames videos database 3330 for storing frames extracted from videos received from camera 120 (e.g., extracted from high-quality videos 3321) and for storing extracted-frames video generated by encoding module 33028 by encoding (e.g., in H.264 encoding format) series of extracted frames; and Event thumbnails 3332 for storing thumbnails representative of portions of videos corresponding to events or alerts;

Object images database(s) 334 for storing one or more databases (e.g., machine-trained databases) of images of objects; and Suggested zone definitions 336 for storing suggested zone definitions.

Video data stored in the video storage database 3320 includes high-quality video 3321 and low-quality video 3322 of videos associated with each of the video sources 522. High-quality video 3321 includes video in relatively high resolutions (e.g., 320P and/or 1080P) and relatively high frame rates (e.g., 24 frames per second). Low-quality video 3322 includes video in relatively low resolutions (e.g., 180P) and relatively low frame rates (e.g., 5 frames per second, 10 frames per second).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 313, optionally, stores a subset of the modules and data structures identified above. Furthermore, memory 313, optionally, stores additional modules and data structures not described above.

Figure 4A:
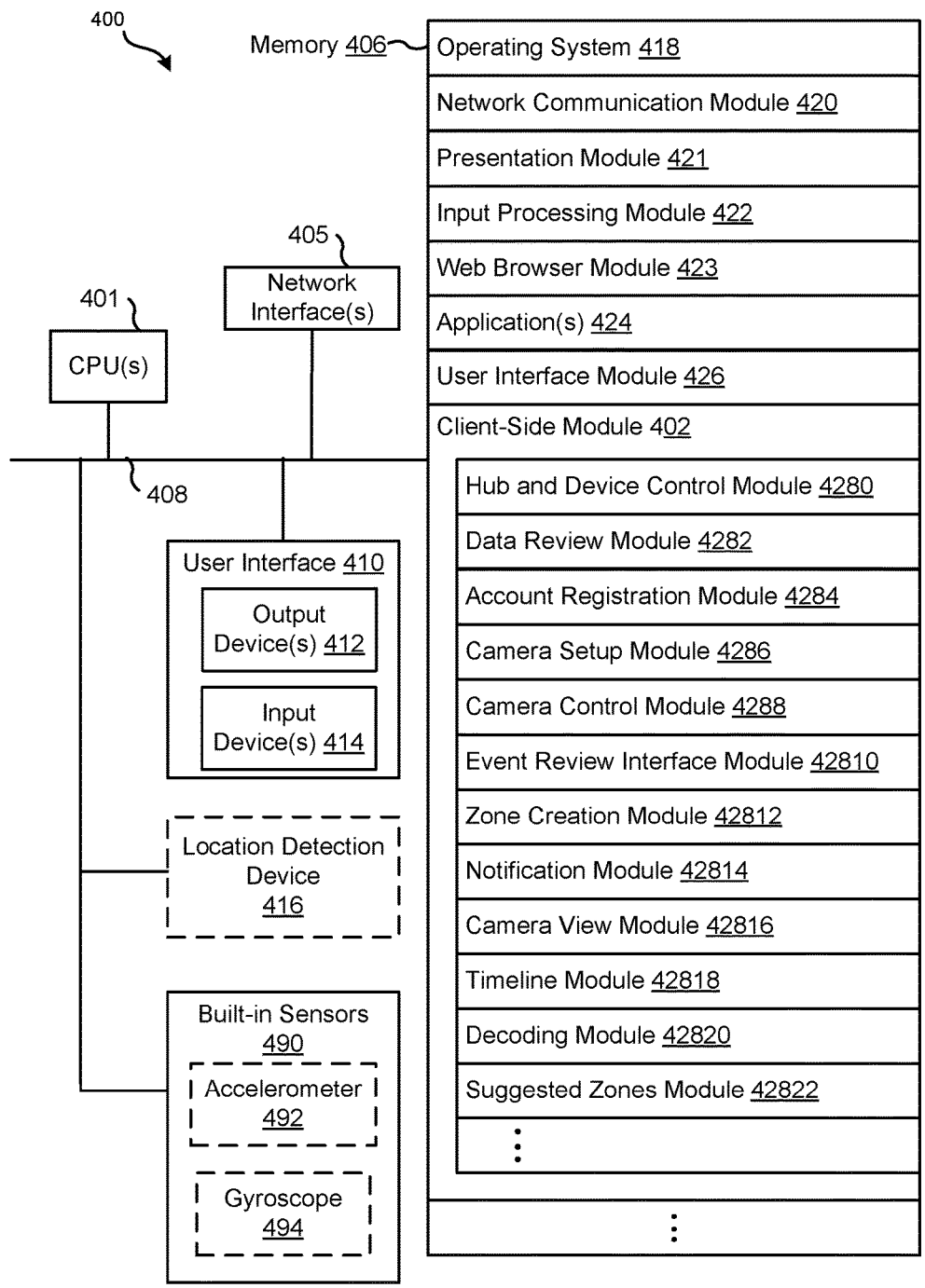
FIGS. 4A and 4B are block diagrams illustrating a representative client device associated with a user account, in accordance with some implementations.
Figure 4B:
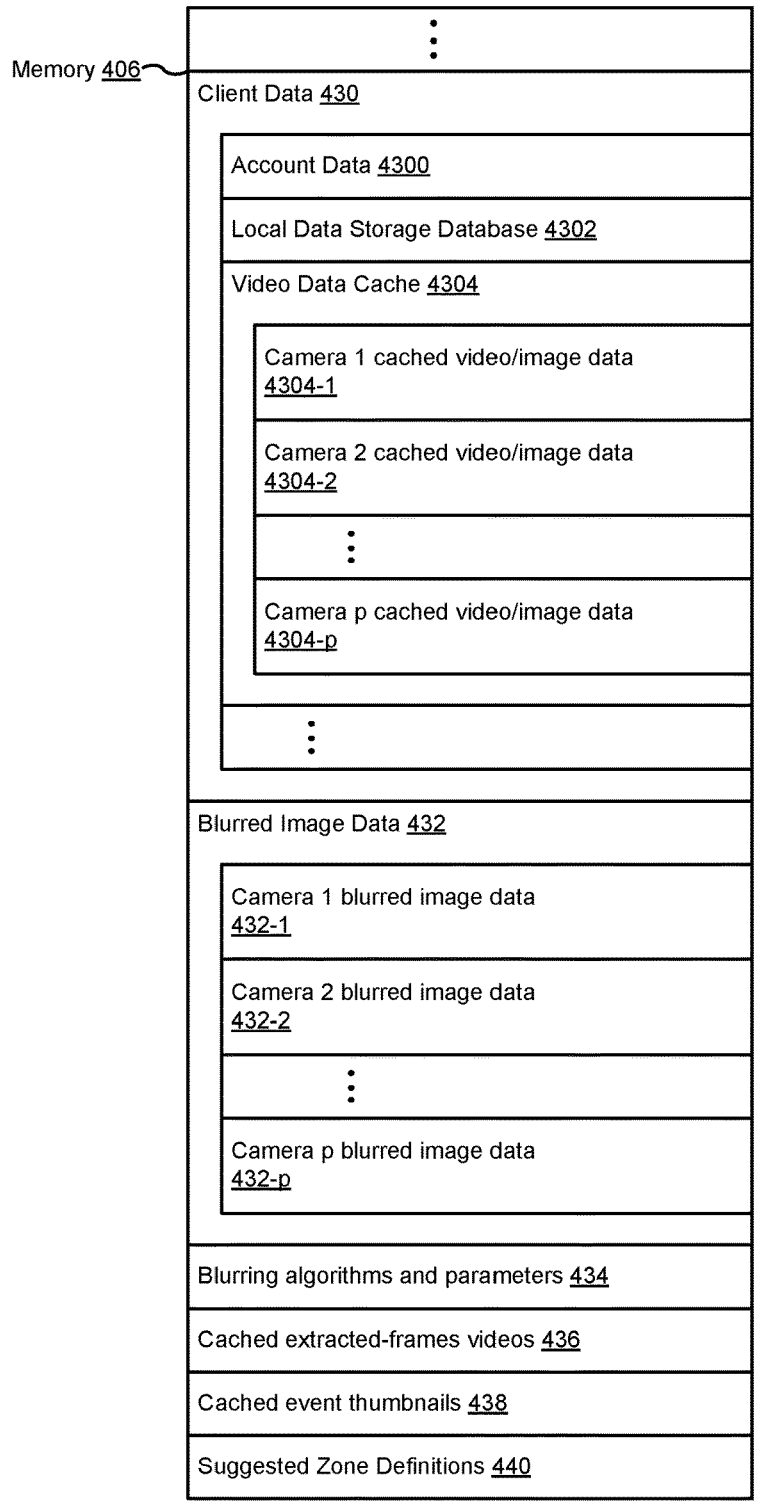

FIGS. 4A and 4B are block diagrams illustrating a representative client device 400 associated with a user account in accordance with some implementations. For example, client device 400 can represent end-user device 150 of FIG. 1 and/or end-user device 266 of FIG. 2. The client device 400, typically, includes one or more processing units (CPUs) 401, one or more network interfaces 405, memory 406, and one or more communication buses 408 for interconnecting these components (sometimes called a chipset). The client device also includes a user interface 410 and one or more built-in sensors 490 (e.g., accelerometer 492 and gyroscope 494). User interface 410 includes one or more output devices 412 that enable presentation of media content, including one or more speakers and/or one or more visual displays. User interface 410 also includes one or more input devices 414, including user interface components that facilitate user input such as a keyboard, a mouse, a voice-command input unit or microphone, a touch screen display, a touch-sensitive input pad, a gesture capturing camera, or other input buttons or controls. Furthermore, the client device 504 optionally uses a microphone and voice recognition or a camera and gesture recognition to supplement or replace the keyboard. Further, the client device 504 optionally uses the accelerometer to detect changes in the orientation of the client device 504, and in particular applications and contexts interpret the change in orientation detected by the accelerometer as user input. In some implementations, the client device 504 includes one or more cameras, scanners, or photo sensor units for capturing images (not shown). In some implementations, the client device 504 optionally includes a location detection device 416, such as a GPS (global positioning satellite) or other geo-location receiver, for determining the location of the client device 504.

Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 401. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

Operating system 418 including procedures for handling various basic system services and for performing hardware dependent tasks;

Network communication module 420 for connecting the client device 504 to other systems and devices (e.g., hub device server system 508, video server system 552, video sources 522) connected to one or more networks 162 via one or more network interfaces 405 (wired or wireless);

Presentation module 421 for enabling presentation of information (e.g., user interfaces for application(s) 424 and web browser module 423 or the client-side module 402, widgets, websites and web pages thereof, and/or games, audio and/or video content, text, etc.) at the client device 504 via the one or more output devices 412 (e.g., displays, speakers, etc.) associated with the user interface 410;

Input processing module 422 for detecting one or more user inputs or interactions from one of the one or more input devices 414 and optionally the accelerometer 492 and interpreting the detected input or interaction;

Web browser module 423 for navigating, requesting (e.g., via HTTP), and displaying websites and web pages thereof, including a web interface for logging into a reviewer account, controlling the video sources associated with the reviewer account, establishing and selecting event filters, and editing and reviewing motion events detected in the video streams of the video sources;

One or more applications 424 for execution by the client device 504 (e.g., games, social network applications, smart home applications, and/or other web or non-web based applications), for controlling devices (e.g., sending commands, configuring settings, etc. to hub devices and/or other client or electronic devices), and for reviewing data captured by the devices (e.g., device status and settings, captured data, or other information regarding the hub device or other connected devices);

User interface module 426 for providing and displaying a user interface in which settings, captured data, and/or other data for one or more devices (e.g., smart devices 204 in smart home environment 200) can be configured and/or viewed;

Client-side module 402, which provides client-side data processing and functionalities for device control, data processing, data review, and monitoring and reviewing videos from one or more video sources and camera events, including but not limited to:

Hub device and device control module 4280 for generating control commands for modifying an operating mode of the hub device or the electronic devices in accordance with user inputs;

Data review module 4282 for providing user interfaces for reviewing data processed by the hub device server system 508 or video server system 552;

Account registration module 4284 for establishing a reviewer account and registering one or more video sources with the hub device server system 508 or video server system 552;

Camera setup module 4286 for setting up one or more video sources within a local area network, and enabling the one or more video sources to access the hub device server system 508 or video server system 552 on the Internet through the local area network;

Camera control module 4288 for generating control commands for modifying an operating mode of the one or more video sources in accordance with user input;

Event review interface module 42810 for providing user interfaces for reviewing event timelines, camera histories with camera events, editing event categorization results, selecting event filters, presenting real-time filtered events based on existing and newly created event filters (e.g., event categories, zones of interest, a human filter, etc.), presenting real-time notifications (e.g., pop-ups) for newly detected events, and presenting smart time-lapse of selected events;

Zone creation module 42814 for providing a user interface for creating zones of interest for each video stream in accordance with user input, and sending the definitions of the zones of interest to the hub device server system 508 or video server system 552;

Notification module 42814 for generating real-time notifications for all or selected alert events or events on the client device 504 outside of the event review user interface;

Camera view module 42816 for generating control commands for modifying a view of a video transmitted to the client device 504 in accordance with user input;

Timeline module 42818 for presenting information corresponding to video transmitted to the client device 504 in a timeline format, facilitating user manipulation of the information displayed in timeline format, and facilitating manipulation of display of the video in accordance with user manipulation of the information, including requesting additional video from the hub device server system 508 or video server system 552 in accordance with the user manipulation;

Decoding module 42820 for decoding extracted-frames video;

Suggested zones module 42822 for presenting suggested zone definitions and associated events and processing user interaction with suggested zone definitions; and Client data 430 storing data associated with the user account, electronic devices, and video sources 522, including, but not limited to:

Account data 4300 storing information related to both user accounts loaded on the client device 504 and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.;

Local data storage database 4302 for selectively storing raw or processed data associated with electronic devices (e.g., of the video sources 522, such as a camera 120); and Video data cache 4304 for caching video and image data from video feeds;

Blurred image data 432;

Blurring algorithms and parameters 434, for generating blurred image data 432 from video/image data in video data cache 4304;

Cached extracted-frames videos 436 for storing or caching extracted-frames videos received from the video server 554;

Cached event thumbnails 438 for storing or caching event thumbnails received from the video server 554; and Suggested zone definitions 440 for storing suggested zone definitions.

Video data cache 4304 includes cached video/image data for respective cameras associated with a user of the client device 400. For example, as shown in FIG. 4B, the video data cache 4304 includes cached video/image data 4304-1 for a first camera, cached video/image data 4304-2 for a second camera, up to cached video/image data 4304-$p$ for a p-th camera. At a given moment, video data cache 4304 may not have cached video/image data for a given camera (e.g., due to the camera being newly associated with the user, due to the cache being cleared, due to the cached video/image data being expired and removed from the cache).

Blurred image data 432 includes sets of progressively blurred images for respective cameras. For example, as shown in FIG. 4B, the blurred image data 432 includes blurred image data (e.g., a set of progressively blurred images) 432-1 for the first camera, blurred image data 432-2 for the second camera, up to blurred image data 432-$p$ for the p-th camera.

In some implementations, the client device 504 caches camera history as well as video data cache 4304. For example, whenever the client device 504 receives camera events history 7328 data from the video server 554, the most recent camera events history (e.g., history from the past two hours, the most recent 20 events) is cached at the client device (e.g., in client data 430). This cached history data may be accessed for quick display of camera history information.

In some implementations, the client-side module 402 and user interface module 426 are parts, modules, or components of a particular application 424 (e.g., a smart home management application).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

Figure 5:
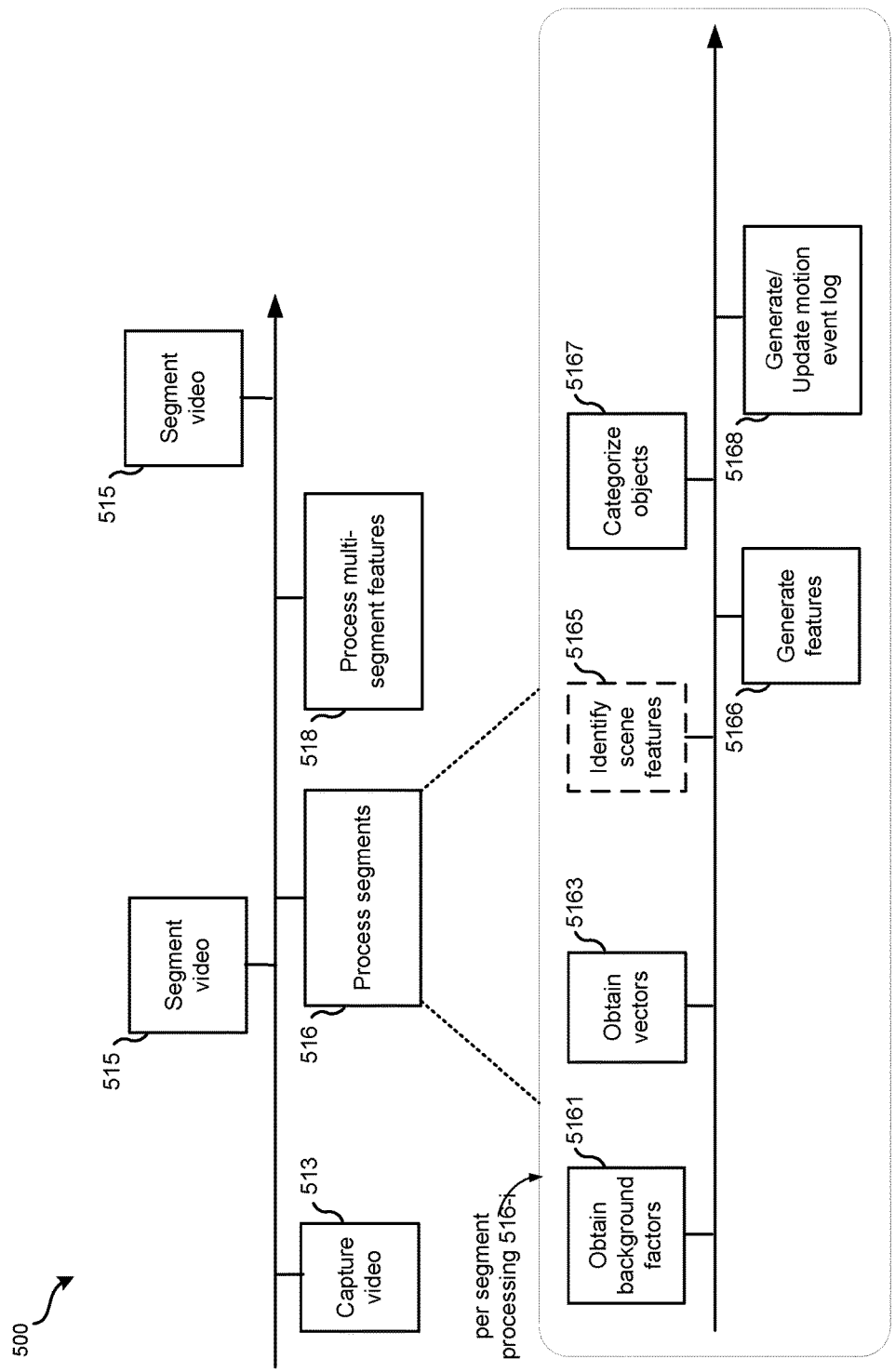
FIG. 5 illustrates an embodiment of an image processing pipeline.

FIG. 5 illustrates a representative image processing pipeline 500, in accordance with some implementations. Image processing pipeline 500 may represent details for performing an analysis of images obtained from the streaming video camera by image analysis engine 331.

After video data is captured at by the streaming video camera (513), the video data is processed to analyze greenspace that is present in the video stream. In some implementations, a more thorough event identification process includes processing multi-segment features (518) and segmenting (515) portions of the video stream into multiple segments, then categorizing portions of the greenspace within each segment (516). In some implementations, categorizing the greenspace candidate includes an aggregation of background factors (5161), obtaining vectors (5163), object identification, and scene features (e.g., using color) (5165) to generate features (5166) that are found in a greenspace, such as plants, a lawn, a garden area, etc. In some implementations, the more thorough event identification process further includes categorizing portions of each segment corresponding to an identified type of plant (5167), generating or updating a greenspace log (5168) based on categorization of a segment, and categorizing the complete health of the greenspace (e.g., based on a color comparison) (519). In some implementations, one or more objects are detected in the video, such as a lawn or greenspace, and one or more suggested zones are defined that incorporate the detected greenspace objects. Image analysis may be performed on images from the video (e.g., frames of the video) to detect one or more objects. Suggested regions or zones may be presented to the user at the client device that correspond to different types of greenspace. The suggested zones, possibly after editing by the user, may be monitored for changes in color and/or other characteristics as detailed in relation to FIG. 3A. These regions or zones (which can be distinct from irrigation zones) may be monitored for future adjustments in irrigation.

In some implementations, one or more of the modules and data stores associated with image processing pipeline 500 may be located in the camera itself and/or in a computing device or system local to the camera (e.g., a server or digital video recorder device or hub device located in the same house as the streaming video camera). In some implementations, one or more of the operations that are described as being performed at or by irrigation management platform 310 may be performed by the camera itself and/or by the computing device or system local to the camera. For example, the camera and/or the local device/system may include analogous modules and data stores for processing the video feed captured by the camera to detect objects, and to generate suggested zone definitions for detected objects.

Figure 6:
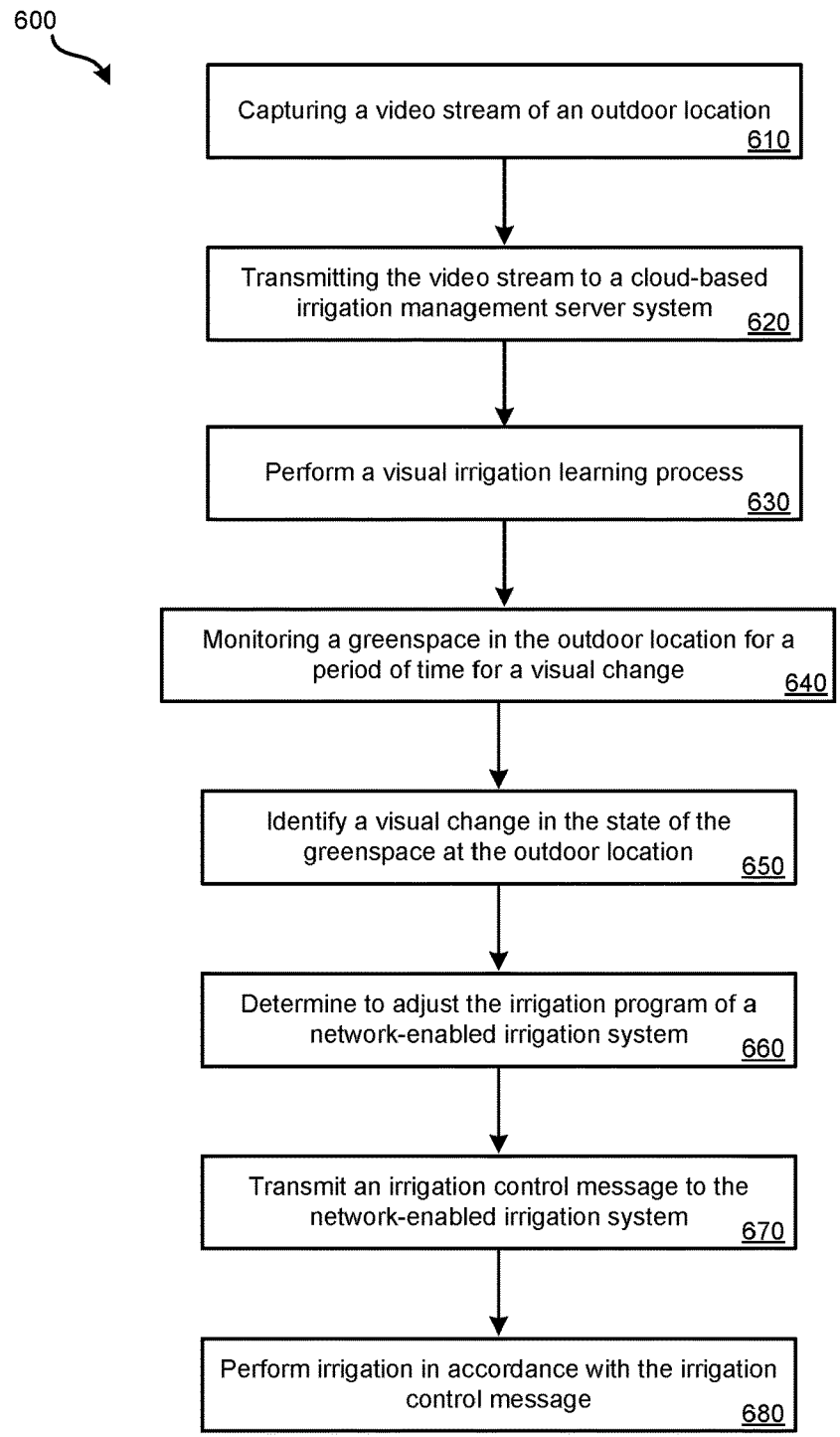
FIG. 6 illustrates an embodiment of a method for adjusting an irrigation schedule of a network-enabled irrigation system.

Various methods may be performed using the systems and devices of FIGS. 1-5. FIG. 6 illustrates an embodiment of a method 600 for adjusting an irrigation schedule of a network-enabled irrigation system. Method 600 may be performed by a cloud-based irrigation management platform that receives video from a streaming video camera via a network. Alternatively, steps of method 600 may be performed locally by the streaming video camera, by a controller unit of the irrigation system, a hub device local to the network-enabled irrigation system or streaming video camera, or by some other computerized device local or remote to the streaming video camera and/or network-enabled irrigation system.

At block 610, a video stream of an outdoor location may be captured using a network-enabled streaming video camera. At least a portion of the field of view present in the video stream may be of an outdoor location that includes a greenspace. This greenspace may be at least partially irrigated using a network-enabled irrigation system. The video stream captured at block 610 may be captured using an outdoor streaming video camera or an indoor streaming video camera that includes the outdoor location within its field of view.

At block 620, the video stream may be transmitted by the streaming video camera to the cloud-based irrigation management platform. Such a transmission may only occur if the video stream is to be analyzed remotely by the irrigation management platform. In some embodiments, the video may be analyzed locally using processing capabilities of the video camera, the network-enabled irrigation system, or some other form of local computerized device. In some embodiments, the streaming video is transmitted primarily for some reason other than irrigation management. For instance, video may be transmitted to a remote cloud-based platform for security purposes, including analysis for motion, storage, and retrieval.

At block 630, a visual irrigation learning process may be performed using the received streaming video. The visual irrigation learning process may be used to determine the relationship between irrigation zones of the network-enabled irrigation system and portions of the greenspace present within the video stream of the outdoor location and characteristics of the greenspace (e.g., amount of direct sun, soil type, sprinkler type, etc.). Additional detail regarding the visual irrigation learning process is provided in relation to method 700 of FIG. 7.

At block 640, a greenspace (e.g., lawn and/or other flora present in the outdoor location) may be monitored for a period of time for visual change. Monitoring the greenspace may include periodically storing a still image or frame from the video feed for eventual comparison with a later captured still image or frame. Periodically, such images may be retrieved and compared to determine how the greenspace has changed over time. For example, a weekly comparison may be performed.

At block 650, a visual change in the state of the greenspace may be observed. This visual change may be identified based on the monitoring performed at block 640. In some embodiments, the visual change includes a color change, size change, and/or shape change. For example, a color shift from green to brown observed in the video feed of the greenspace may be indicative of inadequate watering. As another example, a color shift from green to yellow observed in the video feed of the greenspace may be indicative of overwatering. A shape change may allow wilting plants to be identified. A size change may allow growing plants to be identified.

Other visual changes in the state of the greenspace may be observed. For example, using object recognition, it may be possible to identify fruits or vegetables (and the type of fruit or vegetable) that are growing on a tree or in a garden within the greenspace. A recommendation, in the form of a notification transmitting to an end-user device, may be made to a user about when to harvest the fruit. The recommendation may be based on a color analysis of the fruit. In some embodiments, a database may be accessed to determine when such fruit or vegetable should be harvested and/or when nearby residents harvested such fruits or vegetables. As an example, if a plant is identified as a tomato plant, fruit of the tomato plant would be tomatoes. When a red tomato is observed to be present on the tomato plant, a notification may be provided to an end-user that the tomato is ready for harvesting.

At block 660, the irrigation program of the network-enabled irrigation system may be adjusted in accordance with the identified visual change of block 650. If some or all of the greenspace has become browner over time, the irrigation program may be determined to be adjusted to increase the amount of watering performed of the portion of the greenspace observed in the video stream. If the greenspace has become yellower over time, the irrigation program may be determined to be adjusted to decrease the amount of watering performed of the portion of the greenspace observed in the video stream. The determination to adjust of block 660 may include: adjusting the duration of time for which one or more zones of the irrigation system are watered; adjusting when one or more zones of the irrigation system are watered, and adjusting the frequency at which the one or more zones of the irrigation system are watered.

At block 670, an irrigation control message may be transmitted to the network-enabled irrigation system. This irrigation control message may cause the irrigation system to alter its irrigation program in accordance with the determined adjustment of block 660. In some embodiments, rather than the irrigation system maintaining its own irrigation schedule, the irrigation schedule is maintained by the cloud-based irrigation management platform. In such embodiments, the irrigation control message may indicate that a particular zone of the irrigation system is to be activated. The same irrigation control message or subsequent irrigation control message may inform the irrigation system when the zone is to be deactivated from watering. Therefore, based on the determination of block 660, an irrigation schedule maintained by the irrigation system or an irrigation schedule maintained by the management platform may be altered based on observations made visually on the greenspace.

At block 680, irrigation may be performed by the irrigation system in accordance with the irrigation control message that was transmitted to the irrigation system at block 670.

Figure 7:
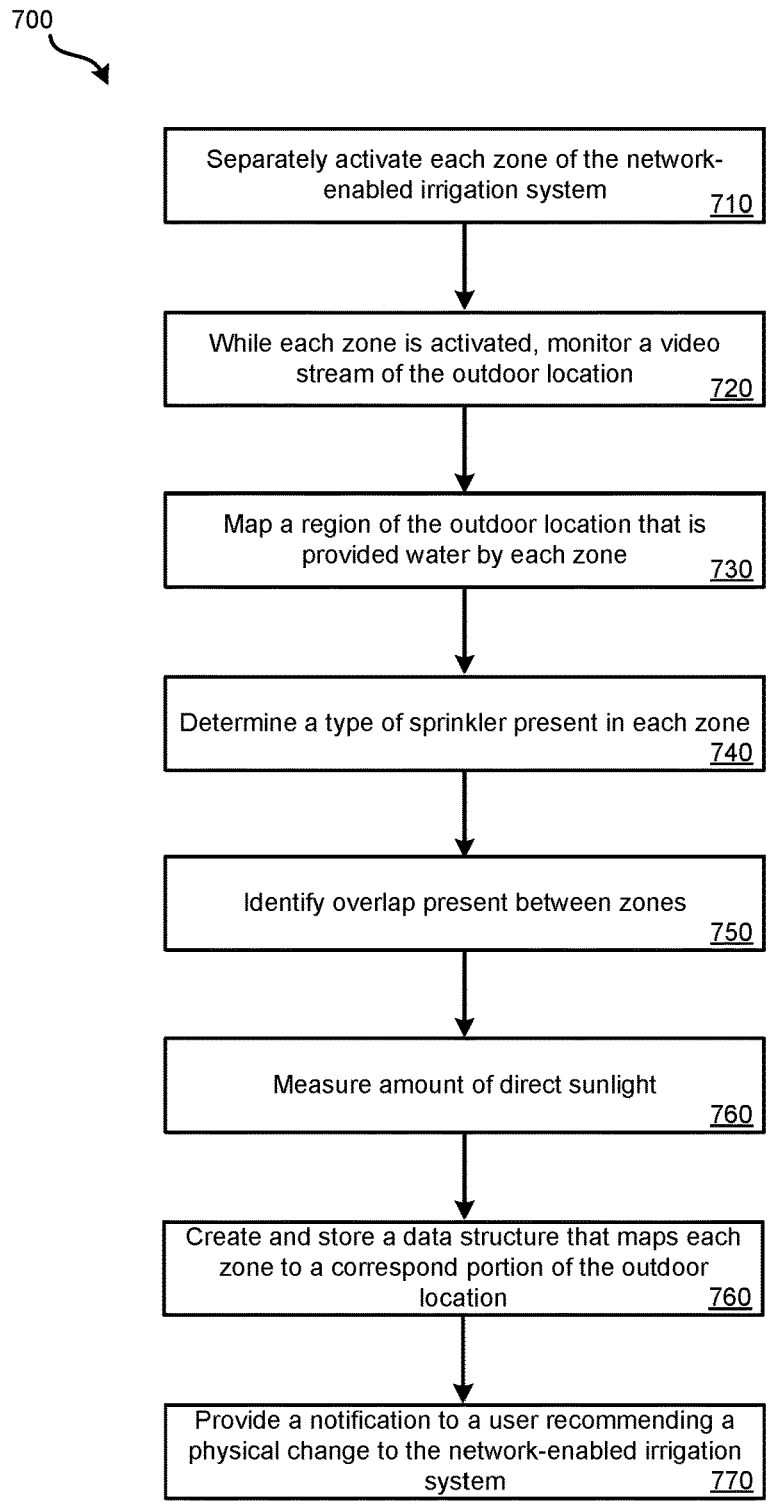
FIG. 7 illustrates an embodiment of a method for performing a visual irrigation learning process.

FIG. 7 illustrates an embodiment of a method 700 for performing a visual irrigation learning process. Method 700 provides additional detail of how the visual irrigation learning process of block 630 of method 600 may be performed. Each step of method 600 may be performed by the cloud-based irrigation management platform. However, if analysis of the streaming video is performed at another location, such as directly at the streaming video camera, the irrigation system, a hub device, or some other computerized device, the blocks of method 600 may be performed at that device.

At block 710, the cloud-based irrigation management platform may send one or more irrigation control messages to the network-enabled irrigation system that causes each zone of the network-enabled irrigation system to activate individually. Therefore, while block 710 is being performed, a single zone of the network-enabled irrigation system may be active at a given time. The irrigation control message may indicate which zone to activate. At block 720, while each zone is individually activated, the received video stream of the outdoor location may be monitored to determine if active irrigation can be detected in the video. Active irrigation may refer to water being sprayed, dripped, or otherwise output by the irrigation system.

At block 730, a map of a region that is provided water by each irrigation zone may be produced. For instance, if zone 2 is activated at block 710 and it is determined via the streaming video that the lawn is being watered at block 720, a mapping can be produced that zone 2 of the irrigation system corresponds to the lawn. The mapping of block 730 may be performed for all zones for which watering can be observed via the video stream. In some embodiments, for zones which cannot be sufficiently monitored via the video stream, user input may be requested regarding the region that is watered by the zone. A user may also have the opportunity to override or otherwise change the mapping determined at block 730.

At block 740, it may be determined a type of sprinkler present in each zone can be observed as part of the outdoor location via the streaming video feed. For instance, rotor sprinkler heads and fixed sprinkler heads may have distinctive visual spray patterns that can be distinguished by an image analysis performed by the irrigation management platform.

At block 750, it may be determined if overlap is present between irrigation zones. If a significant amount of overlap is present, water may be being wasted by a same region of the greenspace being watered multiple times as part of multiple zones. The overlap identified at block 750 may be based on greater than a threshold area being mapped to multiple zones at block 730.

At block 760, an amount of direct sunlight that is incident on the greenspace may be measured by monitoring the streaming video. If, such as based on data retrieved from a weather service, it is known that a day has little cloud cover, the amount of direct sun that is incident on the greenspace can be measured. Direct sun may be determined based on above a threshold brightness level being detected in the streaming video from regions of the field of view that correspond to the greenspace present in the outdoor location. The amount of direct sunlight measured may be averaged over the course of several days or weeks in order to obtain a more accurate measurement. Further, the amount of direct sunlight may vary with season and with changing conditions (e.g., tree growth may block the sun on a lawn). Therefore, the amount of direct sunlight incident on a greenspace may be periodically or occasionally remeasured.

At block 770, a data structure may be created and stored that maps each zone of the irrigation system to a corresponding portion of the greenspace present at the outdoor location. By having a data structure that relates various portions of the greenspace with irrigation zones, the irrigation management platform can determine which zone should be activated in order to provide water to particular parts of the greenspace. In some embodiments, changes to an irrigation program may be performed at least in part on data obtained via method 700. For example, if the amount of direct sunlight on a part of the greenspace has increased as measured at block 760, at block 670, the irrigation control message may increase the amount of water provided to the zone linked with the part of the greenspace. At block 770, a notification to an end-user recommending a physical change in the irrigation system may be provided. For instance, the notification of block 770 may be in response to identifying overlap between zones at block 750. The notification may recommend that the end-user adjust one or more sprinkler heads in order to reduce the amount of overlap. Such an adjustment may include changing a type of sprinkler head, changing the rotation arc of a sprinkler head, changing the nozzle spray pattern of the sprinkler head, and/or changing the throw distance of a sprinkler head. The notification of block 770 may be presented on a mobile device of the user such as presented in FIG. 9.

Figure 9:
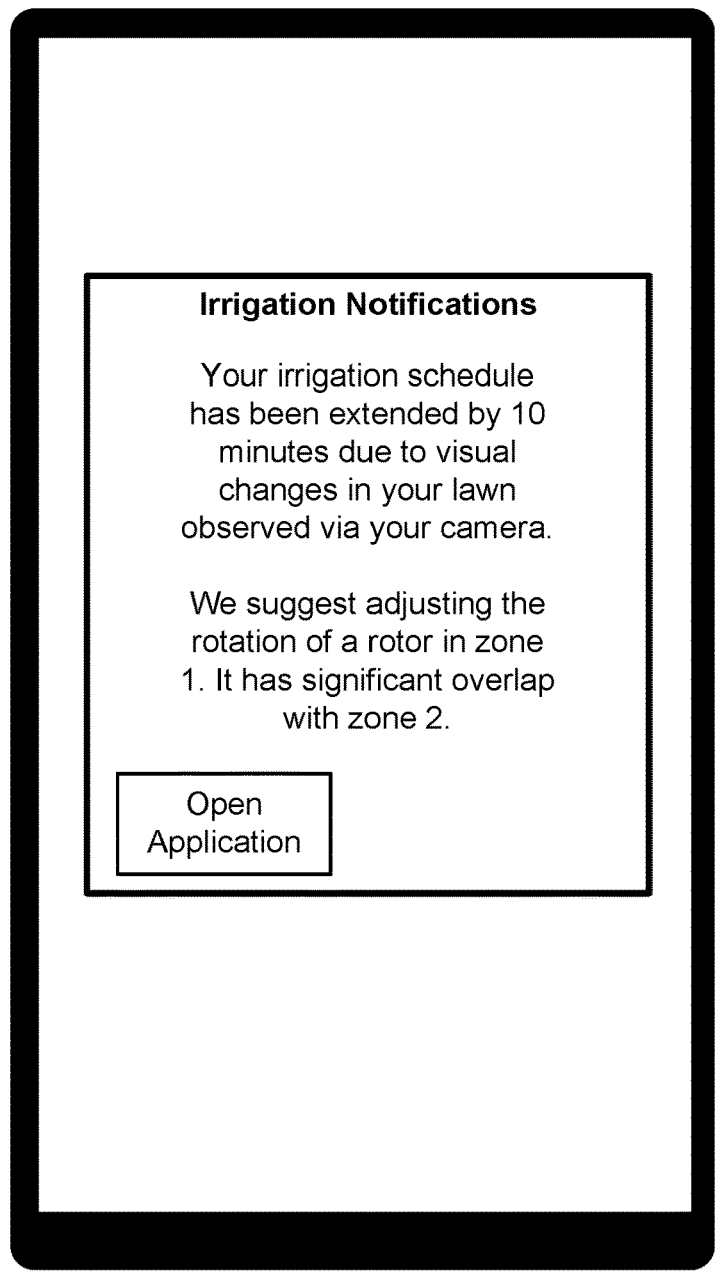
FIG. 9 illustrates an embodiment of notifications that may be provided to a user based on management services provided by the cloud-based irrigation control server system.

FIG. 9 illustrates an embodiment 900 of notifications that may be provided to a user based on management services provided by the cloud-based irrigation control server system. Such a notification may be provided to a mobile device that has been linked with the same user account as the network-enabled irrigation system and streaming video camera. For example, device linkage database 343 of user account data 340 may provide such a link between devices. The notification of embodiment 900 indicates that the irrigation schedule was extended due to visual changes observed in a lawn. This notification may be provided in response to method 600 being performed in which an irrigation program is updated based on visual characteristics of a greenspace. A second notification is also presented in embodiment 900 in which an end-user is informed that a physical change is requested to the irrigation system. This notification may be performed in response to block 750 in which overlap was determined as being present between two or more zones of the irrigation system. The notification may include an option to launch an application that is linked with the irrigation system or irrigation management platform to allow the user to view additional information and/or provide input.

Figure 8:
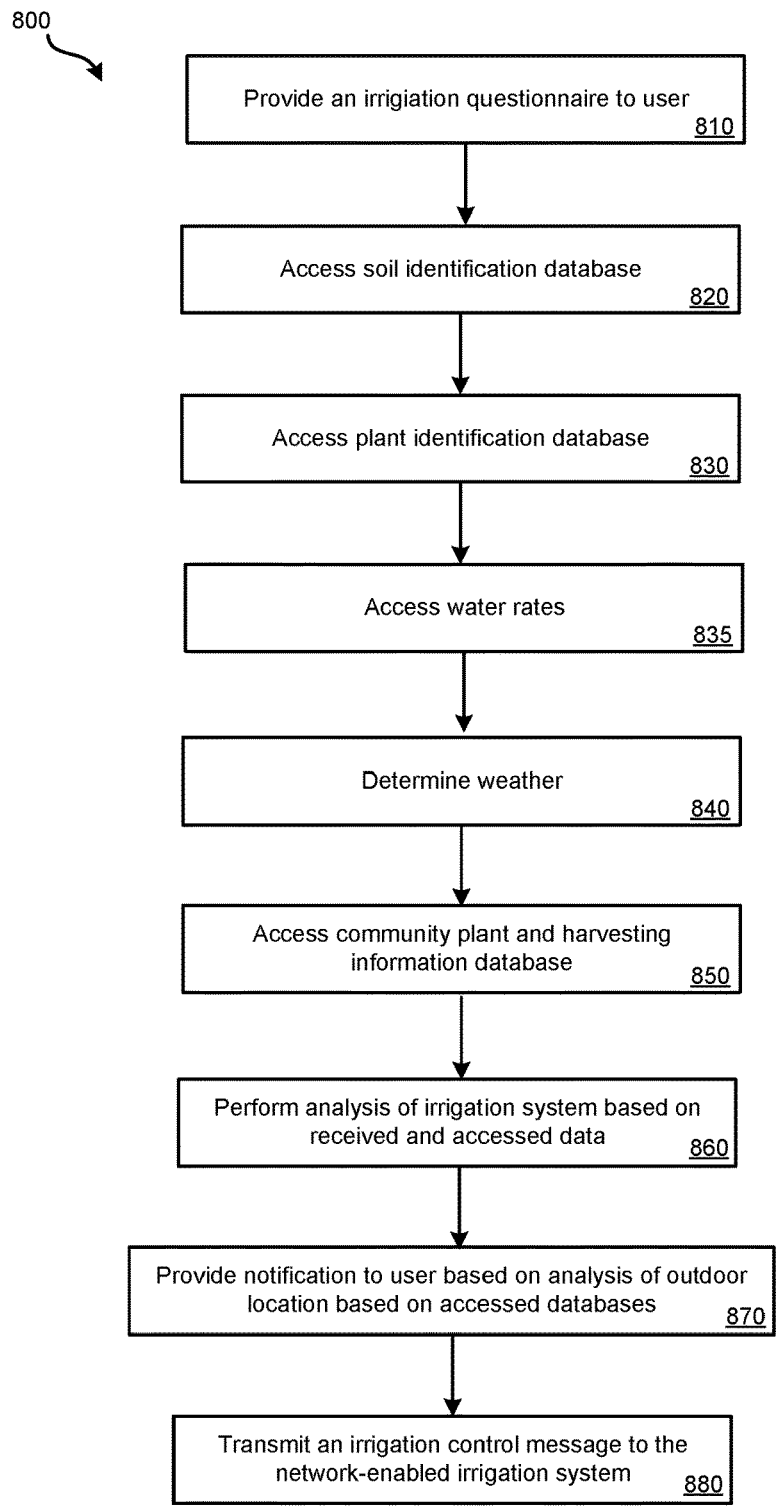
FIG. 8 illustrates an embodiment of a method for using community data to adjust an irrigation schedule of a network-enabled irrigation system and/or provide notifications to a user.

FIG. 8 illustrates an embodiment of a method for using community data to adjust an irrigation schedule of a network-enabled irrigation system and/or provide notifications to a user. Method 800 may be performed by a cloud-based irrigation management platform that receives video from a streaming video camera via a network. Alternatively, each step of method 800 may be performed locally by the streaming video camera, by a controller unit of the irrigation system, by a hub device local to the network-enabled irrigation system or streaming video camera, or by some other computerized device local or remote to the streaming video camera and/or network-enabled irrigation system. Some or all of the blocks of method 800 may be performed At block 810, in irrigation questionnaire may be provided to a user. In some situations, rather than gathering data from the streaming video, it may be more efficient and/or accurate to have a user answer a series of questions, such as via an application executed by an end-user device. Such a questionnaire may allow a user to provide information regarding the type of irrigation system installed, the types of sprinkler heads, the number of zones, the location of zones, the types and locations of zones that are not visible in the video stream, and/or the location of the streaming video camera in relation to the zones.

At block 820, a soil identification database may be accessed in order to determine a soil type likely present at the location of the network-enabled irrigation system. As part of the irrigation question at block 810, a user may be requested to provide a location, such as an address and/or ZIP Code. This information may be used to access a soil identification database. Based upon the characteristics of the soil, the irrigation schedule may be adjusted to account for various characteristics of different types of soil, such as water retention. The soil identification database may be maintained locally as part of the irrigation management platform or may be remotely accessible by the irrigation management platform.

At block 830, a plant identification database may be accessed to identify plants visible in the video feed. Plants that are located within the video feed may be compared with samples of images of plants within the plant identification database. If a plant is positively identified, characteristics of the plant may be accessed and made available to the user. These characteristics may also be used for adjusting an irrigation schedule of the zone in which the plant is located. A user may click or touch on an image of the plant present within a frame of the streaming video to access details about the identified plant. In some embodiments, the plant may be classified in the database as either a desirable or undesirable plant. An undesirable plant may be undesirable due to its characterization as a weed or using an excessive amount of water for the environment in which the irrigation system is installed. A plant may also be identified as unsuitable based on an incorrect amount of direct sun being detected in the vicinity of the identified plant. The plant identification database may be maintained locally as part of the irrigation management platform or may be remotely accessible by the irrigation management platform.

At block 835, water rates and/or the amount of water used in a billing period may be accessed. The cost for water may be used in determining how much water should be applied to a greenspace. For instance, in some jurisdictions, water rates are tiered: a per gallon cost is increased once a particular threshold is reached. By analyzing the water rates, the amount of water used, and the current date within the billing period, irrigation can be delayed (e.g., to be in a different billing period), lengthened in duration (e.g., to take advantage of a lower tier of water pricing), or shortened in duration (e.g., to limit the cost of using water as part of a higher tier of water pricing).

At block 840, the local weather may be determined. The local weather may be determined based on the video feed. Rain may be detected within the video feed based on sound and/or a reduction in visibility due to falling rain or some other form of precipitation. Additionally or alternatively, a weather service may be accessed based on the location of the irrigation system. The weather service may provide weather information from a relatively local weather station. This information may be used to augment or replace information obtained from the video feed.

At block 850, a community planting and harvesting information database may be accessed. This information may be stored in the form of a database and may be collected from multiple different video feeds in the vicinity of the irrigation system, but which may be associated with different user accounts. This community-based data may be used to identify plants that are typically planted in the region near the irrigation system. This community data may also be used to determine when similar plants in the vicinity of the irrigation system have their fruit harvested. For instance, if many homes in an area have tomato plants, the community planting harvesting information database may be updated to include when tomatoes were harvested at these other locations. Such information may be used to provide the user with a notification that he may wish to begin harvesting or at least plan for it in the near future. As another example, the community planting and harvesting information database may be used to provide a recommendation on a type of grass that should be planted in the greenspace, such as based on what other people have planted in the area and the amount of direct sun incident on the greenspace. The community planting harvesting information database may be updated by users directly or may be automatically updated by the irrigation management platform based upon image analysis performed on various video streams. The community planting and harvesting database may be maintained locally as part of the irrigation management platform or may be remotely accessible by the irrigation management platform.

At block 860, analysis may be performed by the cloud-based irrigation management platform to determine actions that should be taken in response to data gathered from the questionnaire and the access to databases of blocks 810 through 850. Such actions can include: increasing or decreasing the amount of irrigation based on soil type; increasing or decreasing the amount of irrigation based on the types of plants present; providing notifications recommending the removal or addition of certain types of plants; increasing or decreasing the amount of irrigation based on the determined weather; increasing or decreasing irrigation based on the accessed community plan and harvesting information; and/or providing an end-user the notification recommending the harvesting of particular fruits or vegetables based on such fruits or vegetables being harvested in the vicinity of where the irrigation system is installed.

At block 870, a notification may be provided to an end user based upon the analysis performed in at block 860. For example, based upon accessing the soil identification database at block 820, a notification may be provided to an end-user that sandy loam is likely his home's soil type. At block 880, an irrigation control message may be transmitted to the network-enabled irrigation system to update the irrigation schedule in accordance with the analysis of block 860. Returning to the previous example, based on the identified soil type, the irrigation schedule may be adjusted.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for visual control of a network-enabled irrigation system, the method comprising:
    capturing, using one or more network-enabled video cameras, one or more video streams of an outdoor location, wherein the outdoor location comprises a lawn;
    transmitting, by the one or more network-enabled video cameras, the one or more video streams of the outdoor location to a cloud-based irrigation management server system via the Internet;
    monitoring, by the cloud-based irrigation management server system, the lawn for a period of time using the one or more video streams;
    performing a visual irrigation learning process, wherein the visual irrigation learning process comprises determining one or more types of sprinkler heads installed in the lawn;
    identifying, by the cloud-based irrigation management server system, based on monitoring the lawn for the period of time, a visual change in a state of the lawn;
    determining, based on the visual change in the state of the lawn, adjustment of an irrigation program of the network-enabled irrigation system; and
    transmitting, by the cloud-based irrigation management server system, an irrigation control message to a controller unit of the network-enabled irrigation system via the Internet, wherein the irrigation control message causes the network-enabled irrigation system to alter an irrigation schedule for the lawn.

2. The method for visual control of the network-enabled irrigation system of claim 1, wherein monitoring the lawn for the period of time using the one or more video streams comprises the cloud-based irrigation management server system determining a duration during which sunlight is directly incident on at least a portion of the lawn.

3. The method for visual control of the network-enabled irrigation system of claim 1, wherein monitoring the lawn for the period of time using the one or more video streams comprises:
    occasionally storing a frame from the one or more video streams of the outdoor location such that a plurality of frames are stored, each frame of the plurality of frames having a timestamp; and
    comparing at least a subset of the plurality of frames.

4. The method for visual control of the network-enabled irrigation system of claim 1, wherein identifying the visual change in the state of the lawn based on monitoring the lawn for the period of time comprises:
    identifying, by the cloud-based irrigation management server system, a color change of the lawn over the period of time.

5. A method for visual control of a network-enabled irrigation system, the method comprising:
    capturing, using one or more network-enabled video cameras, one or more video streams of an outdoor location, wherein the outdoor location comprises a lawn;
    performing, by a cloud-based irrigation management server system, a visual irrigation learning process, wherein the visual irrigation learning process comprises:
        activating each zone of a plurality of zones of the network-enabled irrigation system sequentially; and while each zone of the plurality of zones of the network-enabled irrigation system is activated, monitoring the one or more video streams of the outdoor location;
based on monitoring the one or more video streams of the outdoor location, mapping each zone of the plurality of zones of the network-enabled irrigation system to a corresponding portion of the outdoor location;
storing a data structure that maps each zone of the plurality of zones to the corresponding portion of the outdoor location;
transmitting, by the one or more network-enabled video cameras, the one or more video streams of the outdoor location to the cloud-based irrigation management server system via the Internet;
monitoring, by the cloud-based irrigation management server system, the lawn for a period of time using the one or more video streams;
identifying, by the cloud-based irrigation management server system, based on monitoring the lawn for the period of time, a visual change in a state of the lawn;
determining, based on the visual change in the state of the lawn, adjustment of an irrigation program of the network-enabled irrigation system; and
transmitting, by the cloud-based irrigation management server system, an irrigation control message to a controller unit of the network-enabled irrigation system via the Internet, wherein the irrigation control message causes the network-enabled irrigation system to alter an irrigation schedule for the lawn.

6. A method for visual control of a network-enabled irrigation system, the method comprising:
capturing, using one or more network-enabled video cameras, one or more video streams of an outdoor location, wherein the outdoor location comprises a lawn;
transmitting, by the one or more network-enabled video cameras, the one or more video streams of the outdoor location to a cloud-based irrigation management server system via the Internet;
performing a visual irrigation learning process, wherein the visual irrigation learning process comprises:
determining that a first zone and a second zone of a plurality of irrigation zones overlap; and
transmitting, by the cloud-based irrigation management server system, a notification to a user linked with a user account that is linked with the network-enabled irrigation system, wherein the notification is indicative of the overlap between the first zone and the second zone;
monitoring, by the cloud-based irrigation management server system, the lawn for a period of time using the one or more video streams;
identifying, by the cloud-based irrigation management server system, based on monitoring the lawn for the period of time, a visual change in a state of the lawn;
determining, based on the visual change in the state of the lawn, adjustment of an irrigation program of the network-enabled irrigation system; and
transmitting, by the cloud-based irrigation management server system, an irrigation control message to a controller unit of the network-enabled irrigation system via the Internet, wherein the irrigation control message causes the network-enabled irrigation system to alter an irrigation schedule for the lawn.

7. The method for visual control of the network-enabled irrigation system of claim 1, further comprising:
identifying, by the cloud-based irrigation management server system, based on monitoring the lawn for the period of time, a recommended physical change to be made to the network-enabled irrigation system; and
transmitting, by the cloud-based irrigation management server system, a notification to a user linked with a user account that is linked with the network-enabled irrigation system, wherein the notification is indicative of the recommended physical change to be made to the network-enabled irrigation system.

8. A method for visual control of a network-enabled irrigation system, the method comprising:
capturing, using one or more network-enabled video cameras, one or more video streams of an outdoor location, wherein the outdoor location comprises a lawn;
transmitting, by the one or more network-enabled video cameras, the one or more video streams of the outdoor location to a cloud-based irrigation management server system via the Internet;
monitoring, by the cloud-based irrigation management server system, the lawn for a period of time using the one or more video streams;
identifying, by the cloud-based irrigation management server system, based on monitoring the lawn for the period of time, a recommended physical change to be made to the network-enabled irrigation system, wherein the recommended physical change is selected from a group consisting of:
a change in a spray pattern of a sprinkler of the network-enabled irrigation system;
a change in a sprinkler type of the sprinkler of the network-enabled irrigation system; and
a replacement of the sprinkler of the network-enabled irrigation system; and
transmitting, by the cloud-based irrigation management server system, a notification to a user linked with a user account that is linked with the network-enabled irrigation system, wherein the notification is indicative of the recommended physical change to be made to the network-enabled irrigation system.

9. The method for visual control of the network-enabled irrigation system of claim 1, further comprising:
receiving an indication of a location of the network-enabled irrigation system; and
performing a look-up of a soil type typically found in a region that includes the location of the network-enabled irrigation system, wherein the irrigation control message that causes the network-enabled irrigation system to alter the irrigation schedule for the lawn is at least partially based on the soil type typically found in the region.

10. The method for visual control of the network-enabled irrigation system of claim 1, wherein altering the irrigation schedule for the lawn comprises an action selected from the group consisting of:
increasing an amount of time of watering of the lawn by the network-enabled irrigation system;
decreasing the amount of time of watering of the lawn by the network-enabled irrigation system; and
changing a start time of watering of the lawn by the network-enabled irrigation system.

11. The method for visual control of the network-enabled irrigation system of claim 1, further comprising initiating, by the network-enabled irrigation system, irrigation in accordance with the altered irrigation schedule.

12. A network-enabled irrigation system, comprising:
a network-enabled streaming video camera that transmits a video stream of an outdoor location comprising a lawn via the Internet to a cloud-based irrigation management server system; and
the cloud-based irrigation management server system, comprising:
one or more processors; and
a memory communicatively coupled with and readable by the one or more processors and having stored therein processor-readable instructions which, when executed by the one or more processors, cause the one or more processors to:
monitor the lawn for a period of time using the video stream;
perform a visual irrigation learning process, wherein the visual irrigation learning process comprises determining one or more types of sprinkler heads installed in the lawn;
identify based on monitoring the lawn for the period of time, a visual change in a state of the lawn;
determine, based on the visual change in the state of the lawn, adjustment of an irrigation program of the network-enabled irrigation system; and
transmit an irrigation control message to a controller unit of the network-enabled irrigation system via the Internet, wherein the irrigation control message causes the network-enabled irrigation system to alter an irrigation schedule for the lawn.

13. The network-enabled irrigation system of claim 12, further comprising the controller unit of the network-enabled irrigation system that is configured to: alter the irrigation schedule based on the irrigation control message; and water the lawn based on the altered irrigation schedule.

14. The network-enabled irrigation system of claim 12, wherein the processor-readable instructions that, when executed, cause the one or more processors to monitor the lawn for the period of time using the video stream comprise processor-readable instructions which, when executed, cause the one or more processors to determine a duration during which sunlight is directly incident on at least a portion of the lawn.

15. The network-enabled irrigation system of claim 12, wherein the processor-readable instructions that, when executed, cause the one or more processors to monitor the lawn for the period of time using the video stream comprise processor-readable instructions which, when executed, cause the one or more processors to:
occasionally store a frame from the video stream of the outdoor location such that a plurality of frames are stored, each frame of the plurality of frames having a timestamp; and
compare at least a subset of the plurality of frames.

16. The network-enabled irrigation system of claim 12, wherein the processor-readable instructions that, when executed, cause the one or more processors to identify the visual change in the state of the lawn based on monitoring the lawn for the period of time comprise processor-readable instructions which, when executed, cause the one or more processors to:
identify a color change of the lawn over the period of time.

17. A network-enabled irrigation system, comprising:
a network-enabled streaming video camera that transmits a video stream of an outdoor location comprising a lawn via the Internet to a cloud-based irrigation management server system; and
the cloud-based irrigation management server system, comprising:
one or more processors; and
a memory communicatively coupled with and readable by the one or more processors and having stored therein processor-readable instructions which, when executed by the one or more processors, cause the one or more processors to:
activate each zone of a plurality of zones of the network-enabled irrigation system sequentially;
while each zone of the plurality of zones of the network-enabled irrigation system is activated, monitor the one or more video streams of the outdoor location;
based on monitoring the one or more video streams of the outdoor location, map each zone of the plurality of zones of the network-enabled irrigation system to a corresponding portion of the outdoor location;
store a data structure that maps each zone of the plurality of zones to the corresponding portion of the outdoor location;
monitor the lawn for a period of time using the video stream;
identify based on monitoring the lawn for the period of time, a visual change in a state of the lawn;
determine, based on the visual change in the state of the lawn, adjustment of an irrigation program of the network-enabled irrigation system; and
transmit an irrigation control message to a controller unit of the network-enabled irrigation system via the Internet, wherein the irrigation control message causes the network-enabled irrigation system to alter an irrigation schedule for the lawn.

18. The network-enabled irrigation system of claim 17, wherein the processor-readable instructions that, when executed, further comprise processor-readable instructions which, when executed, cause the one or more processors to:
determine that a first zone and a second zone of the plurality of zones overlap; and
cause a notification to be transmitted to a user linked with a user account that is linked with the network-enabled irrigation system, wherein the notification is indicative of the overlap between the first zone and the second zone.

19. The network-enabled irrigation system of claim 12, wherein the processor-readable instructions, when executed, further cause the one or more processors to:
identify, based on monitoring the lawn for the period of time, a recommended physical change to be made to the network-enabled irrigation system; and
transmit a notification to a user linked with a user account that is linked with the network-enabled irrigation system, wherein the notification is indicative of the recommended physical change to be made to the network-enabled irrigation system.

20. A non-transitory processor-readable medium comprising processor-readable instructions configured to cause one or more processors to:
receive, from one or more network-enabled video cameras, one or more video streams of an outdoor location via the Internet;
monitor a lawn for a period of time using the one or more video streams;

perform a visual irrigation learning process that comprises determining one or more types of sprinkler heads installed in the lawn;

identify based on monitoring the lawn for the period of time, a visual change in a state of the lawn present in the outdoor location;

determine, based on the visual change in the state of the lawn, adjustment of an irrigation program of a network-enabled irrigation system; and transmit an irrigation control message to a controller unit of the network-enabled irrigation system via the Internet, wherein the irrigation control message causes the network-enabled irrigation system to alter an irrigation schedule for the lawn.

* * * * *